(12) United States Patent
Haller

(10) Patent No.: US 11,654,799 B2
(45) Date of Patent: May 23, 2023

(54) APPARATUS FOR ADJUSTING A SEAT POSITION

(71) Applicant: GRAMMER AG, Ursensollen (DE)

(72) Inventor: Erwin Haller, Birgland (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 17/082,209

(22) Filed: Oct. 28, 2020

(65) Prior Publication Data

US 2021/0122265 A1 Apr. 29, 2021

(30) Foreign Application Priority Data

Oct. 29, 2019 (DE) .......................... 102019129162.3

(51) Int. Cl.
| | | |
|---|---|---|
| *B60N 2/16* | (2006.01) | |
| *B60N 2/02* | (2006.01) | |
| *B60N 2/50* | (2006.01) | |
| *B60N 2/52* | (2006.01) | |

(52) U.S. Cl.
CPC ......... *B60N 2/1615* (2013.01); *B60N 2/0232* (2013.01); *B60N 2/502* (2013.01); *B60N 2/505* (2013.01); *B60N 2/522* (2013.01); *B60N 2/525* (2013.01); *B60N 2002/0236* (2013.01)

(58) Field of Classification Search
CPC ...... B60N 2/1615; B60N 2/502; B60N 2/505; B60N 2/522; B60N 2/0232
See application file for complete search history.

(56) References Cited

U.S. PATENT DOCUMENTS

| | | | |
|---|---|---|---|
| 3,917,211 A | * | 11/1975 | Daunderer ..................... 248/421 |
| 4,128,225 A | | 12/1978 | Kluting et al. |
| 4,326,690 A | | 4/1982 | Pickles et al. |
| 4,842,334 A | | 6/1989 | Voss et al. |
| 10,384,571 B2 | | 8/2019 | Lorey |

(Continued)

FOREIGN PATENT DOCUMENTS

| | | |
|---|---|---|
| CN | 110293883 | 10/2019 |
| DE | 60704 | 3/1968 |

(Continued)

OTHER PUBLICATIONS

U.S. Appl. No. 17/082,153, filed Oct. 28, 2020, Haller.

(Continued)

*Primary Examiner* — Anthony D Barfield
(74) *Attorney, Agent, or Firm* — Sheridan Ross P.C.

(57) ABSTRACT

The invention relates to an apparatus for adjusting a seat position for a vehicle seat, which comprises at least one support element for a seat part and can be connected to a seat substructure, wherein the apparatus comprises at least one first limb and at least one second limb, wherein the limbs can be rotatably arranged on the seat substructure and the at least one support element, wherein a first angle α between the first limb and the support element can be adjusted by an angle adjustment device, wherein the at least one first limb and the at least one second limb each have a lever portion, and these are mechanically coupled, and wherein a change in the angle α causes a displacement of the at least one support element along a height axis Z, and a change in an angle of inclination θ of the support element.

18 Claims, 12 Drawing Sheets

(56) References Cited

U.S. PATENT DOCUMENTS

| | | |
|---|---|---|
| 2002/0060488 A1 | 5/2002 | Delmas et al. |
| 2004/0075322 A1 | 4/2004 | Jaeger et al. |
| 2006/0261647 A1 | 11/2006 | Maas et al. |
| 2012/0187735 A1 | 7/2012 | Foelster et al. |

FOREIGN PATENT DOCUMENTS

| | | |
|---|---|---|
| DE | 2306478 | 8/1974 |
| DE | 2626442 | 12/1977 |
| DE | 3437962 | 4/1986 |
| DE | 3447040 | 6/1986 |
| DE | 19848952 | 5/2000 |
| DE | 19914163 | 10/2000 |
| DE | 19927930 | 4/2001 |
| DE | 29824882 | 3/2003 |
| DE | 102010049365 | 8/2011 |
| DE | 102010044057 A1 * | 5/2012 |
| DE | 102017213169 | 1/2019 |
| EP | 0787621 | 8/1997 |
| EP | 0882619 | 12/1998 |
| EP | 2360051 | 8/2011 |
| EP | 1863671 | 1/2012 |
| GB | 1208051 | 10/1970 |
| GB | 1307749 | 2/1973 |
| GB | 2081082 | 2/1982 |
| WO | WO 2011/131875 | 10/2011 |
| WO | WO 2019/096774 | 5/2019 |

OTHER PUBLICATIONS

U.S. Appl. No. 17/082,176, filed Oct. 28, 2020, Haller.
Extended European Search Report for European Patent Application No. 20203397.3, dated Mar. 12, 2021, 8 pages.
Extended European Search Report for European Patent Application No. 20203398.1, dated Mar. 24, 2021, 7 pages.
Extended European Search Report for European Patent Application No. 20203400.5, dated Mar. 26, 2021, 7 pages.
Official Action for German Patent Application No. 102019129159.3, dated Jun. 22, 2020, 7 pages.
Official Action for German Patent Application No. 102019129161.5, dated Jun. 22, 2020, 7 pages.
Official Action for German Patent Application No. 102019129162.3, dated Jun. 22, 2020, 7 pages.
Official Action with English Translation for German Patent Application No. 102019129159.3, dated Sep. 10, 2021, 5 pages.
Official Action with English Translation for German Patent Application No. 102019129161.5, dated Sep. 10, 2021, 5 pages.
Official Action with English Translation for German Patent Application No. 102019129162.3, dated Sep. 10, 2021, 7 pages.
Official Action for U.S. Appl. No. 17/082,153, dated Mar. 2, 2022 5 pages.
Official Action (with English translation) for China Patent Application No. 2020111766594, dated Jul. 7, 2022, 11 pages.
Official Action with English Translation for China Patent Application No. 202011179543.6, dated Jul. 4, 2022, 15 pages.
Official Action with English Translation for China Patent Application No. 202011183663.3, dated Jul. 11, 2022, 14 pages.
Notice of Allowance for U.S. Appl. No. 17/082,153, dated Jun. 23, 2022 6 pages.
Official Action for U.S. Appl. No. 17/082,176, dated Jul. 18, 2022, 11 pages.
Official Action for U.S. Appl. No. 17/082,176, dated Jan. 12, 2023 7 pages.
Official Action with English Translation for China Patent Application No. 202011179543.6, dated Feb. 5, 2023, 11 pages.
Official Action with English Translation for China Patent Application No. 202011183663.3, dated Feb. 13, 2023, 17 pages.

* cited by examiner

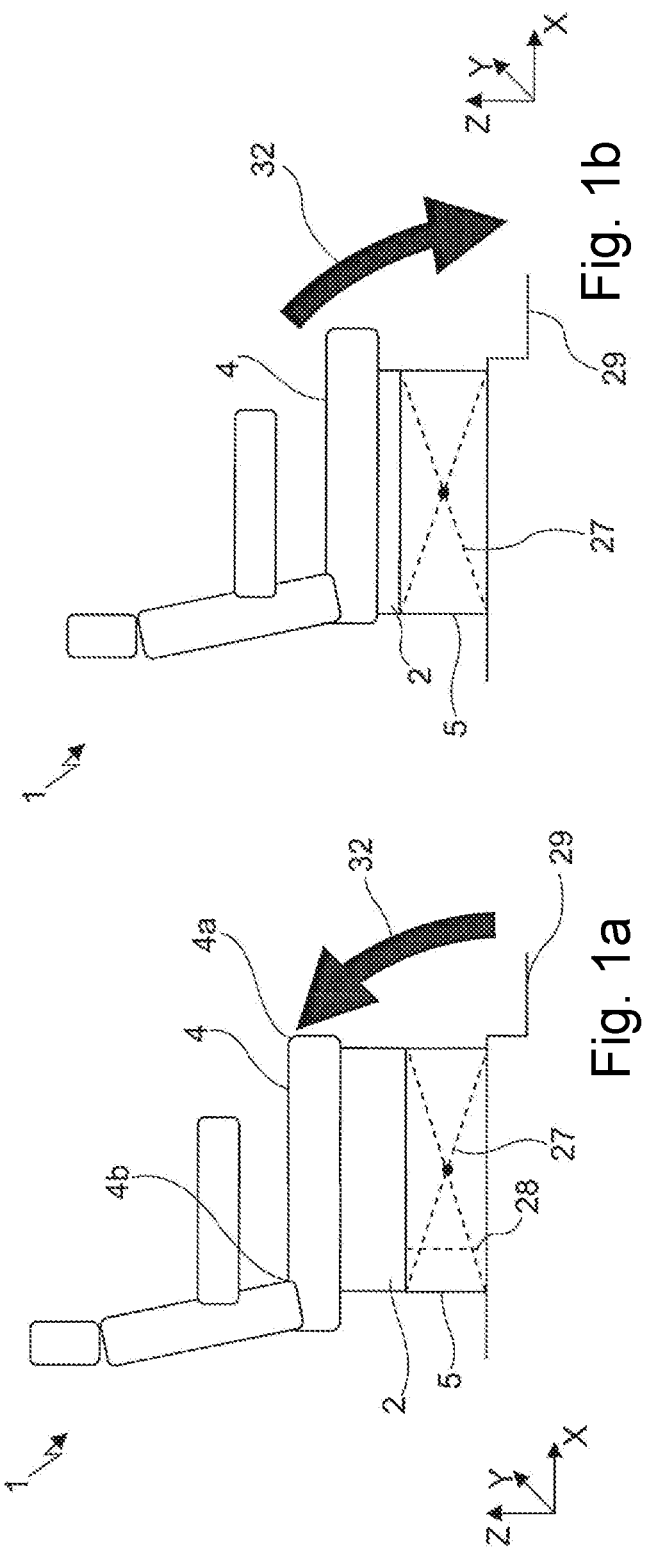

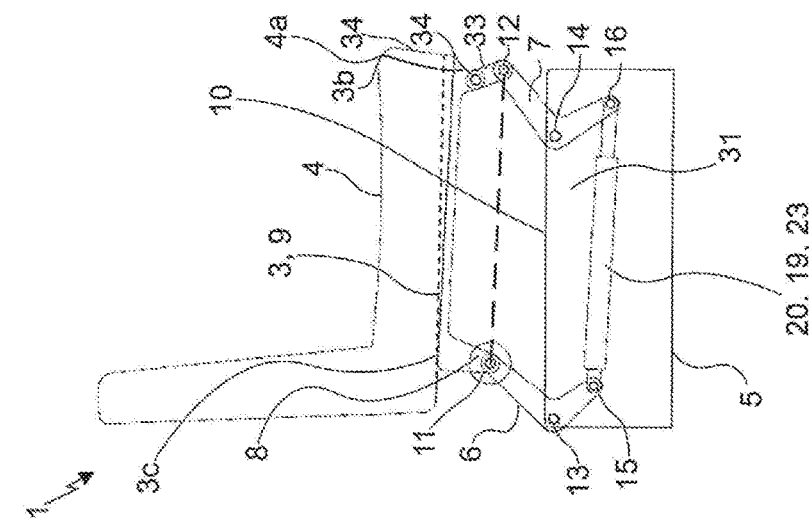
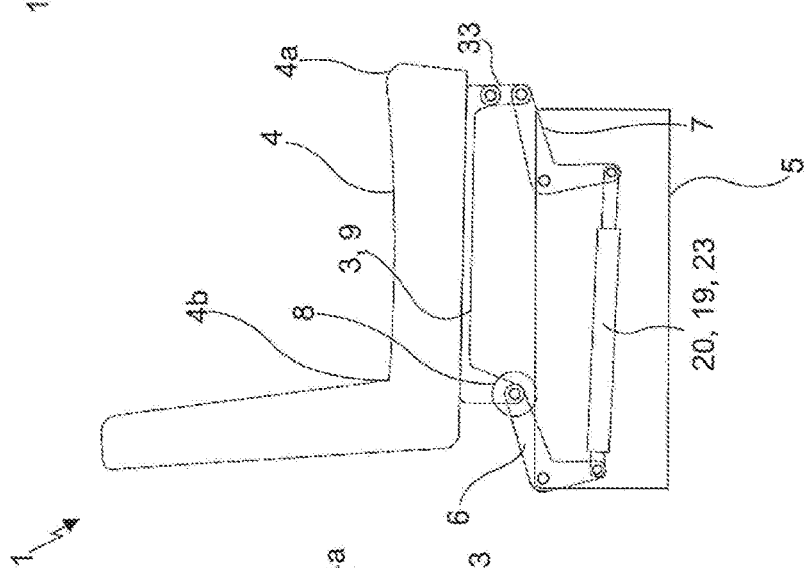
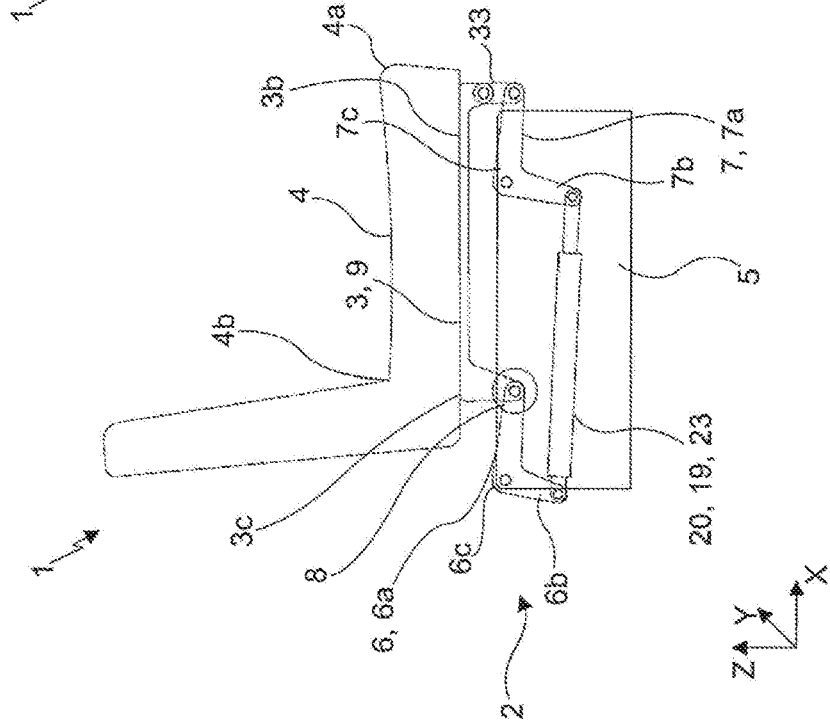

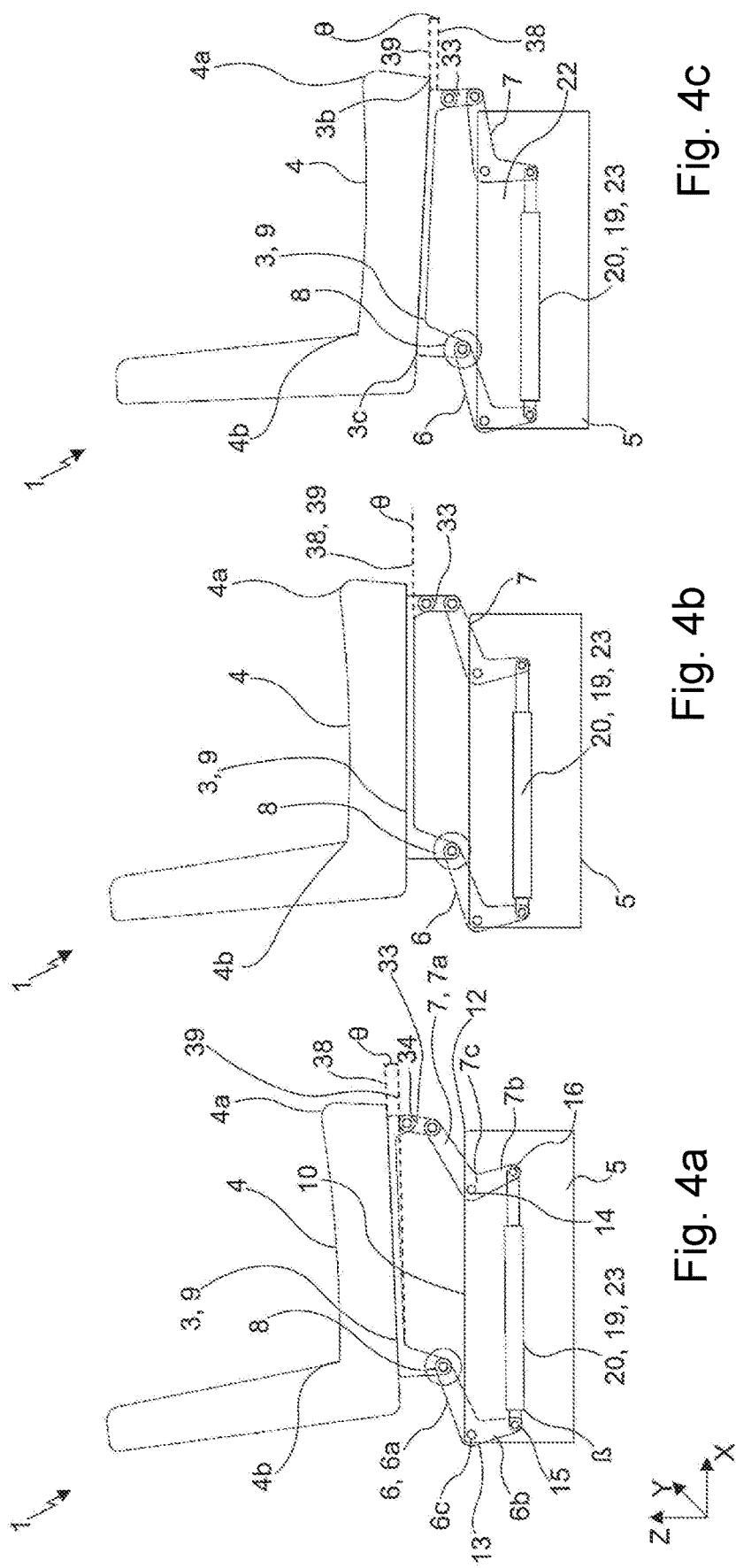

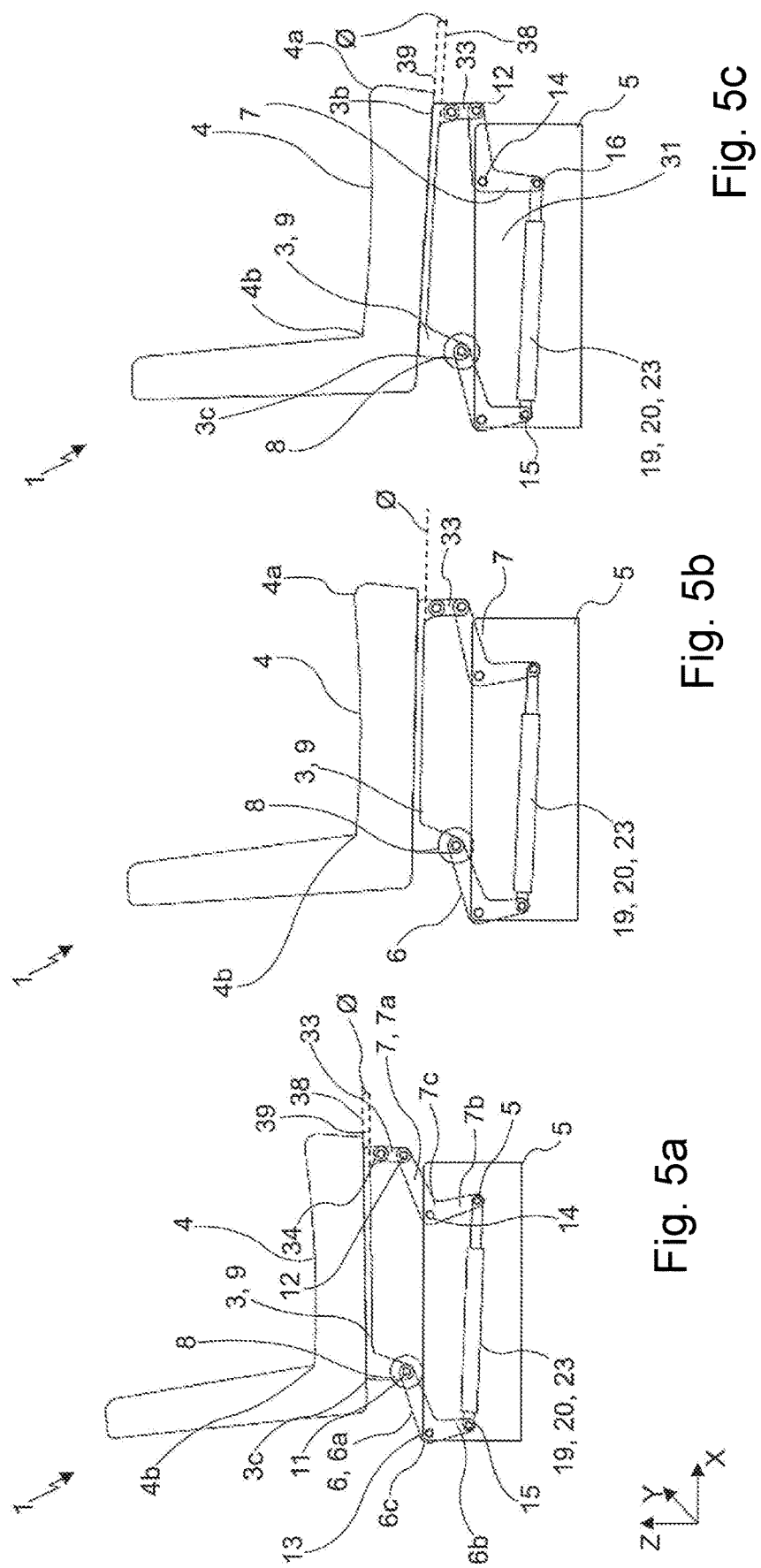

APPARATUS FOR ADJUSTING A SEAT POSITION

CROSS-REFERENCE TO RELATED APPLICATIONS

This application claims the benefit of German Patent Application No. 10 2019 129 162.3 filed Oct. 29, 2019, the entire contents of which are incorporated herein by reference.

FIELD

The invention relates to an apparatus for adjusting a seat position for a vehicle seat, the apparatus being connectable to at least one support element for a seat part and to a seat substructure.

BACKGROUND

Such apparatuses are provided in particular for vehicle seats in commercial vehicles such as tractors, construction machinery, forklifts, lorries, etc. Such vehicle seats, in particular driver seats, in commercial vehicles must meet special conditions with respect to seat ergonomics, since the passengers and/or drivers generally have to spend long periods of time in them. It is desirable that the vehicle seat can be optimally adjusted for different seat positions. It should also be taken into account that the vehicle seat is used by passengers of different sizes and must therefore be adapted accordingly. Such a large number of adjustment options for the vehicle seat often results in the vehicle seat being complex to an undesirable degree.

To correspond to the height of the driver, the driver's seat must be adjusted along the height direction Z and along the longitudinal direction X in order to allow the driver to have the optimal seat height and the optimal distance from the pedals. In addition, the inclination of the seat part is usually adjusted. As such, a taller driver preferably sits further up along the height axis Z and further back along the longitudinal axis X than a shorter driver. Furthermore, taller drivers prefer to incline the seat part rearwards. With such an inclination, a front edge of the seat part is pivoted upwards along the height axis Z. Common driver's seats with an upright seat position usually offer the option of adjusting the seat height position. In most cases, such an adjustment is made by moving the seat substantially in a vertical direction. After the seat height is adjusted, the inclination of the seat part, and optionally the seat position in the longitudinal direction X, must be adjusted in a further step. If it is necessary to change drivers frequently, such a procedure can be perceived as cumbersome.

SUMMARY

The object of the present invention is to provide a vehicle seat which overcomes the problems named above.

The object is achieved by an apparatus for adjusting a seat position for a vehicle seat, which comprises at least one support element for a seat part and can be connected to a seat substructure, wherein the apparatus comprises at least one first limb and at least one second limb, wherein the apparatus comprises at least one first limb and at least one second limb, wherein the limbs can be rotatably arranged on the seat substructure and the at least one support element, wherein a first angle α between the first limb and the support element can be adjusted by an angle adjustment device, wherein the at least one first limb and the at least a second limb each have a lever portion, and these are mechanically coupled, and wherein a change in the angle α causes a displacement of the at least one support element along a height axis Z, and a change in an angle of inclination θ of the support element.

The apparatus according to the invention enables a simple adjustment of the seat height and of the inclination of the seat surface at the same time. The seat surface is the uppermost surface of the seat part on which the passenger sits. For some passengers, it is more comfortable if the seat is not exactly horizontal, but rather inclined slightly forward. Other passengers prefer to incline the seat rearwards. From an ergonomic point of view, the seat surface should be inclined to an extent that the thighs rest lightly and without pressure on the seat part. The more the thigh is supported, the better the sitting pressure is distributed. This leads to a noticeable relief, especially on long journeys. The apparatus according to the invention accordingly enables two ergonomically relevant seat parameters to be adjusted simultaneously—specifically, the seat height and the inclination of the seat surface. Furthermore, the apparatus is designed to be extremely simple in construction, and is therefore inexpensive to manufacture.

The apparatus or the vehicle seat, respectively, extend along a height axis Z. A displacement along the height axis Z can take place downwards—that is, in the direction of the vehicle floor—or upwards. The apparatus and/or the vehicle seat also extend along a longitudinal axis X. A displacement along the longitudinal axis X can take place to the front—that is, in the direction of the pedals—or to the rear. Finally, the apparatus and/or the vehicle seat extend along a width axis Y.

The term "substantially" as used in the following should be interpreted to mean that minor tolerance deviations are claimed as well. Thus, the deviation may be an angle of preferably less than 10°, more preferably less than 7.5°, even more preferably less than 5°.

According to a preferred embodiment, the mechanical coupling comprises a connecting element which connects the lever portions of the limbs. According to a further preferred embodiment, the change in the angle of inclination θ is the result of a different length of the lever portions of the at least one first limb and the at least one second limb, and/or is the result of a modification of the length of the connecting element. The inclination of the seat part is therefore advantageously made possible by the mechanical coupling of the two limbs and the different lengths of the lever portion of the two limbs. The lever portion of the at least one second limb preferably has a greater length than the lever portion of the at least one first limb. Furthermore, a connecting element can be provided, the length of which can be modified. By advantageously modifying the distance between the lever portions, a further change in the angle of inclination θ can be made possible. If both lever portions of the limbs have the same length, the angle of inclination θ remains unchanged when the angle α is changed. The seat part would therefore preferably be displaced with a horizontal orientation along the vertical axis Z. In such a case, the angle of inclination θ is changed by advantageously modifying the length of the connecting element. In this case, the change in the angle of inclination θ is preferably proportional to the change in the length of the connecting element.

According to a particularly preferred embodiment, the angle of inclination θ extends between a central axis of the at least one support element and a reference axis which is substantially parallel to a longitudinal axis X of the apparatus. Accordingly, the at least one support element is arranged in a first plane which comprises the central axis. The seat surface of the seat part is advantageously arranged substantially parallel to the first plane. The reference axis is comprised by a reference plane spanning the longitudinal axis X and the width axis Y. The reference plane is preferably substantially parallel to a vehicle body floor. The seat part preferably has a rear region which lies against an advantageous backrest. The seat part has a front region opposite thereof, along the longitudinal axis X, which in an embodiment as a driver's seat is preferably oriented towards the pedals. A front and a rear region of the support element can also be defined in a corresponding manner. When the at least one support element or the seat surface has a horizontal orientation, the angle of inclination θ is substantially 0°. Advantageously, when an angle of inclination θ is greater than 0°, a front region of the support element or a front region of the seat part is pivoted upwards along the height direction Z. When an angle of inclination θ is less than 0°, a front region of the support element or a front region of the seat part is preferably pivoted downwards along the height direction Z. For an advantageous inclination rearwards, the angle θ would accordingly assume positive values. For an advantageous inclination forward, the angle of inclination θ would accordingly assume negative values. The angle of inclination θ can preferably be adjusted in a range between −60° and +60°, preferably in a range between −45° and +45°, and more preferably in a range between −30° and +30°.

According to a further advantageous embodiment, a change in the angle α causes a displacement of the at least one support element along a height axis Z, and at the same time along a longitudinal axis X, as well as a change in an angle of inclination θ of the support element. Accordingly, three ergonomically relevant seat parameters are advantageously changed by a change in the angle α. These are the seat height, the seat position in the longitudinal direction X and/or the distance to the pedals and the steering wheel, and the inclination of the seat part. A change in the angle α which causes a downward displacement of the at least one support element along the height axis Z preferably simultaneously causes the at least one support element to be displaced forwards along the longitudinal axis X, and a change in the angle of inclination θ in the negative direction. A change in the angle α which causes an upwards displacement of the at least one support element along the height axis Z advantageously simultaneously causes the at least one support element to be displaced rearwards along the longitudinal axis X, and a change in the angle of inclination θ in the positive direction. When the angle of inclination θ changes in the positive direction, a positive angle value becomes greater and a negative angle value becomes smaller. This is also described as a change in the inclination of the seat part rearwards. When the angle of inclination θ changes in the negative direction, a positive angle value becomes smaller and a negative angle value becomes greater. This is also described as a change in the inclination of the seat part forwards.

By such a synchronised adjustment of the seat positions with respect to the height of the distance to the pedals and the inclination of the seat part results in a quick ergonomic adaptation of the seat position for short and tall drivers. As a rule, short drivers need lower seat heights and must at the same time sit further forward along the longitudinal axis X. In contrast, tall drivers must position themselves further up along the height axis Z and further back along the longitudinal axis X. An extremely quick and easy adjustment of the seat position is made possible. In order to adapt the seat position with respect to the three seat parameters, it is only necessary to actuate the advantageous angle adjustment device. The angle α is advantageously held by the angle adjustment device until it is actuated again. The angle adjustment device can accordingly also be viewed as an angle locking device.

According to a particularly preferred embodiment, the at least one first limb is arranged behind the at least one second limb along the longitudinal axis X. It is advantageous in this case that the at least one first limb is connected to the at least one second limb along the longitudinal axis X by means of a first longitudinal connection. The first longitudinal connection is advantageously realised by the at least one support element or by the seat part. Furthermore, it is advantageous that the at least one first limb and the at least one second limb are connected along the longitudinal axis X by means of a second longitudinal connection. The second longitudinal connection is preferably realised by the seat substructure. The mechanical coupling preferably comprises the first and the second longitudinal connection. Advantageously, the first and longitudinal connections are rigid connections and their length therefore cannot be changed. According to a further preferred embodiment, the at least one first limb and the at least one second limb each have a first portion, and each have the lever portion and/or second portion. The first portion and the lever portion preferably together form an angle β. As a result, the at least one first limb and the at least one second limb are advantageously designed substantially in the shape of an L. A bend region is preferably provided between the first portion and the lever portion.

According to a further preferred embodiment, the at least one first limb and the at least one second limb are each mounted rotatably about an axis of rotation relative to the support element. The at least one first limb and the at least one second limb are advantageously each mounted rotatably about a further axis of rotation relative to the seat substructure. The axis of rotation which refers to the rotation relative to the support element is preferably arranged in an upper end region of the first portion. The axis of rotation which refers to the rotation relative to the seat substructure is preferably arranged in the bend region.

A third longitudinal connection along the longitudinal axis X between the lever portion of the at least one first limb and the lever portion of the at least one second limb is preferably realised by the connecting element. The mechanical coupling advantageously comprises the third longitudinal connection, the length of which can preferably be modified. However, it would also be conceivable that the third longitudinal connection is a rigid connection. Each of the lever portions is preferably rotatable about an axis of rotation relative to the connecting element. The axis of rotation with respect to a rotation of the at least one first or the at least one second limb relative to the connecting element, is advantageously arranged in a lower end region of each of the lever portions.

According to a further concept of the invention, the at least one second limb is indirectly connected to the at least one support element. The at least one second limb is advantageously connected to the at least one support element via a spacer element or a connecting rod. There are thus advantageously two axes of rotation with respect to a rotation of the second limb relative to the support element. These two axes of rotation are preferably arranged one above the other along the height axis Z and/or are spaced apart. The spacer element and/or connecting rod is advantageously rotatable relative to the at least one second limb about an axis of rotation. This results in an advantageous further degree of freedom which can be used for adjusting an inclination of the seat part.

Adjusting the angle α accordingly changes the orientation of the at least one first limb. Accordingly, the first limb is advantageously rotated about a corresponding direction of rotation. Due to the mechanical coupling between the at least one first limb and the at least one second limb, the rotation of the at least one first limb is transmitted to the at least one second limb. Accordingly, the at least one second limb moves and/or rotates analogously to the at least one first limb. The movement of the entirety of the at least one first limb and the at least one second limb advantageously results in the displacement of the at least one support element or the seat part. Due to the advantageous embodiment in which the lever portion of the at least one second limb has a greater length than the lever portion of the first limb, the rotation of the at least one second limb differs from the rotation of the at least one first limb. This difference is advantageously a function of the ratio of the lengths of the lever portions of the at least one first and the at least one second limb. This difference advantageously causes a rotation of the spacer element and a different displacement along the height axis Z of the front region relative to the rear region of the at least one support element or seat part, which causes a change in the angle of inclination θ. The angle adjustment device can advantageously only act directly on the at least one first limb. The angle adjustment device preferably also acts indirectly on the at least one second limb through the aforementioned mechanical coupling.

Advantageously, the angle α is formed between a central axis of the first limb 6 and an imaginary reference line of the support element, which is substantially perpendicular to the seat part. The angle α is in a range between 0° and 140°. The angle α is preferably in a range between 0° and 120°. The angle α is more preferably in a range between 0° and 90°. The change in the seat position along the height axis Z and along the longitudinal axis X is advantageously proportional to a change in the angle α.

An operating element, by means of which the angle adjustment device can be operated, is preferably provided. Accordingly, only one operating device needs to be actuated to adjust the seat position. The vehicle seat can preferably also have at least one additional adjustment device for the seat position along the longitudinal axis X, by means of which an additional adjustment of the seat position is made possible. This enables individualized adjustment of the seat position.

According to a particularly preferred embodiment, the connecting element is suitable and provided for maintaining its modifiable length, preferably until a new modification is carried out. This means that the length of the connecting element is adjustable, and the adjusted length is then maintained by the connecting element until it is adjusted again. The connecting element can advantageously be activated by means of an operating and control device. It is advantageous that the operating and control device comprises a memory device by means of which certain length values of the connecting element can be stored. Since the certain length values can correspond to certain angles of inclination θ, preferred inclination settings are therefore saved and are selected accordingly by the user. The length of the connecting element is advantageously continuously adjustable.

According to a preferred embodiment, the connecting element is a lockable gas spring. According to a further advantageous embodiment, the connecting element is an actuating element. The actuating element preferably comprises a lifting spindle. This lifting spindle is driven by a corresponding advantageous actuating drive, which can preferably be an electric motor.

According to a further preferred embodiment, the modification of the length of the connecting element causes a rotation of the at least one second limb about at least the axis of rotation with respect to a rotation relative to the connecting element, and about the axis of rotation with respect to a rotation relative to the seat substructure. The modification of the length of the connecting element advantageously causes a rotation of the at least one second limb about the axis of rotation with respect to a rotation relative to the support element. The angle α is advantageously fixed when the length of the connecting element is modified. This can preferably be done by the angle adjustment device or the fixing element. The modification of the length of the connecting element advantageously does not cause any rotation of the at least one first limb. A rotation of the second limb preferably causes the change in the angle of inclination θ.

According to a further preferred embodiment, the first portion of the at least one first limb and the first portion of the at least one second limb have the same length. The axes of rotation with respect to the rotation relative to the support element of the at least one first limb and of the at least one second limb preferably lie on a first imaginary or real connecting line. Furthermore, it is preferred that the axes of rotation with respect to the rotation relative to the seat substructure of the at least one first limb and of the at least one second limb lie on a second imaginary or real connecting line. The first connecting line, the second connecting line and the first portions of the at least one first limb and of the at least one second limb advantageously form a trapezoid. Such a trapezoidal shape favours the simultaneous displacement of the seat surface along the height axis Z and the longitudinal axis X. The trapezoid can be a parallelogram if the first portions each have the same length and the first and second connecting lines also have the same length.

The connecting lines which form the advantageous trapezoid and/or parallelogram can accordingly be real connecting lines—that is, the connecting line is comprised by a corresponding element, for example the seat substructure or the support element. However, it would also be conceivable that although there are connections between the limbs, these do not represent direct connections between the axes of rotation. Accordingly, for example, the actual connections between the axes of rotation along the height axis Z could lie above or below the imaginary connection line.

According to a further preferred embodiment, the lever portion of the at least one first limb and the lever portion of the at least one second limb have different lengths. The axes of rotation with respect to the rotation of the at least one first limb and the at least one second limb relative to the connecting element preferably lie on a third imaginary or real connecting line. It is preferred that the second connecting line, the third connecting line and the second portions of the at least one first limb and the at least one second limb form an (irregular) rectangle. In an embodiment in which the lever portion of the at least one first limb and the lever portion of the at least one second limb have the same lengths, the rectangle would be a second trapezoid—and/or a parallelogram if the second and third connecting lines still have the same length. A change in the length of the connecting element advantageously changes both the first trapezoid and the second trapezoid.

Advantageously, a change in inclination when the seat position changes along the height axis Z and along the longitudinal axis X in the embodiment described, in which the arrangement of the limbs describes an irregular rectangle, can be compensated for by modifying the length of the connecting element, such that the support element and/or the seat surface are aligned substantially horizontally and/or parallel to the vehicle body floor. This can preferably be done automatically. For this purpose, the operating and control device can be connected to corresponding sensors which detect a corresponding change in the seat position. The operating and control device can then calculate the necessary modification of the length of the connecting element, and actuate the connecting element accordingly.

According to a further preferred embodiment, two first limbs and two second limbs are provided. The two first limbs are preferably spaced apart from each other along the width axis Y. The two first limbs are preferably rotatable about the same axes of rotation. The two second limbs are advantageously spaced apart from each other along the width axis Y. Both second limbs are preferably rotatable about the same axes of rotation.

These axes of rotation, about which the pairs of the first limbs and the second limbs, respectively, are each rotatable, can preferably be axles which are mounted in a corresponding rotary mount of the limbs. Each of these axes of rotation can be a continuous, real axis which is mounted in the corresponding rotary mount of the limbs. The axis of rotation can also be a continuous, imaginary axis which extends through corresponding rotary mounts of the two limbs.

The limbs lying opposite each other along the width axis Y are preferably connected by means of at least one transverse connection. These transverse connections can advantageously be realised by the support element or by the seat part. However, it would also be conceivable that the transverse connections are realised by other struts, rods, etc.

According to a further preferred embodiment, at least one support element must be a plate-like element which extends along the longitudinal axis X and the width axis Y. The first and second limbs are preferably arranged on the underside of this plate-like element. Accordingly, the first longitudinal connection(s) is/are realised by the plate-like element. The seat part is advantageously arranged on the top of the plate-like element. However, it would also be conceivable that a plurality of support elements is provided. Each of the transverse connections and the first longitudinal connections would then advantageously be realised by the seat part.

According to a further preferred embodiment, the angle adjustment device comprises a locking device which sets an adjusted angle α. The orientation of the at least one first limb relative to the support element and/or relative to the seat substructure is therefore preferably set and held by the locking device. Likewise, the orientation of the at least one second limb relative to the support element and/or relative to the seat substructure is set and held by the mechanical coupling between the at least one first and the at least one second limb. Such a locking device can preferably be a so-called "recliner". The angle adjustment device advantageously comprises a drive by means of which the locking device is driven in order to change the angle α. The angle adjustment device is preferably an electrically actuatable gear unit. The angle adjustment device preferably comprises a control unit which actuates the drive. It is advantageous that certain seat positions can be stored in the control unit. The user can then switch between the saved positions. An operating device by means of which the user can make appropriate inputs is preferably provided.

According to a further preferred embodiment, the apparatus is a modular component. Accordingly, the apparatus for adjusting a seat position for a vehicle seat is advantageously not integrated into other structural components of a vehicle seat. The device can advantageously be arranged between the seat substructure and the seat part. It is only necessary to furnish and/or provide appropriate fastening elements. This enables a simplification of the construction of the seat substructure. An advantageous vertical suspension, which is independent of the apparatus as a result of the modular structure, could thus be reduced to its main task, the isolation of vibrations and the maintenance of the height level. The modular design of the apparatus also makes it possible to retrofit existing vehicle seats with this apparatus in the simplest possible way.

The present problem is also solved by a vehicle seat having an apparatus according to any one of the described embodiments.

The vehicle seat can be equipped with all the features already described above in the context of the apparatus, individually or in combination with each other, and vice-versa.

The vehicle seat can advantageously comprise a scissor frame by means of which the vehicle seat is attached to the vehicle and/or the vehicle body floor. It is also advantageous that the vehicle seat comprises a suspension and/or damping device for the suspension/damping of vertical and/or horizontal vibrations. As a result of the already-described preferred modular structure, the seat substructure can be simpler in design.

According to a further embodiment, the vehicle seat can comprise a device for adjusting the seat position along the longitudinal axis X. This can be, for example, a rail system on the vehicle body floor on which the seat substructure is displaceably arranged.

It is also preferred if the vehicle seat comprises a device for adjusting the inclination of the seat part.

The vehicle seat can be designed as a driver's seat or as a passenger seat.

BRIEF DESCRIPTION OF THE DRAWINGS

Other advantages, aims and properties of the present invention are explained with reference to the following description of the attached drawings. Similar components may have the same reference signs in the various embodiments.

In the drawings:

FIG. 1a, 1b is a side view of the vehicle seat according to one embodiment;

FIGS. 3a to 3c is a view of the vehicle seat according to one embodiment, in different seat positions;

FIGS. 4a to 4d is a view of the vehicle seat according to one embodiment, in different seat positions;

FIGS. 5a to 5c is a view of the vehicle seat according to one embodiment, in different seat positions;

DETAILED DESCRIPTION

Figure 2C:
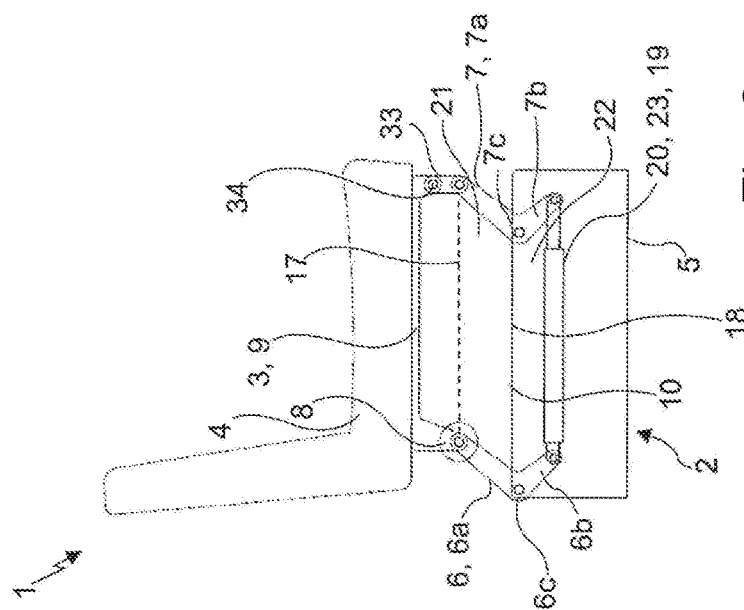
FIGS. 2a to 2c is a view of the vehicle seat according to one embodiment, in different seat positions.

FIGS. 1 to 15c show an apparatus 2 for adjusting a seat position for a vehicle seat 1. The apparatus 2 comprises at least one support element 3 for a seat part 4 and can be connected to a seat substructure 5. The apparatus 2 further comprises at least one first limb 6 and at least one second limb 7, wherein the limbs 6, 7 can be rotatably arranged on the seat substructure 5 and the at least one support element 3, wherein a first angle α between the first limb 6 and the support element 3 can be adjusted by an angle adjustment device 8, wherein the at least one first limb 6 and the at least one second limb 7 each have a lever portion 6b, 7b, and these are mechanically coupled, wherein a change in the angle α causes a displacement of the at least one support element 3 along a height axis Z and a change in an angle of inclination θ of the support element 3.

The mechanical coupling comprises a connecting element 19 which connects the lever portions 6b, 7b of the limbs 6, 7. The change in the angle of inclination θ is due to a different length of the lever portions 6b, 7b of the at least one first limb and the at least one second limb 7. The lever portion 7b of the at least one second limb 7 has a greater length than the lever portion 6b of the at least one first limb 6. Alternatively or in addition, the change in the angle of inclination θ can be caused by a modification of the length of the connecting element 19.

The vehicle seat and/or the apparatus for adjusting the seat position extend along a height axis Z, a longitudinal axis X, and a width axis Y.

The vehicle seat 1 can of course comprise a backrest, a head part, and armrests, as is shown for example in FIGS. 1a and 1b. The seat part 4 can comprise a shell element with a cushion element arranged thereon, or solely a cushion element. The seat part 4 comprises a front region 4a which, in an embodiment as a driver's seat, points towards the pedals of the vehicle. The rear region 4b opposite the front region adjoins the backrest. A front region 3b of the support element 3 and a rear region of the support element 3 can be defined in a corresponding manner. The seat substructure 5 can advantageously comprise a scissor frame 27, by means of which the vehicle seat 1 is fastened to the vehicle or the vehicle body floor 29. Furthermore, it is advantageous that the seat substructure 5 comprises a suspension and/or damping device 28 for the suspension/damping of vertical and/or horizontal vibrations. This is shown in FIGS. 1a and 1b.

As can be seen from FIGS. 1 to 15c, the apparatus 1 for adjusting a seat position is a modular component and can therefore be integrated into a vehicle seat 1 in the simplest possible way. Furthermore, older vehicle seats can be retrofitted with such a modular component.

The angle of inclination θ extends between a central axis 38 of the at least one support element 3 and a reference axis 39 which is substantially parallel to a longitudinal axis X of the apparatus 2. For an angle of inclination θ greater than 0°, the front region 4a of the seat part 4 and/or a front region 3b of the support element 3 is pivoted upwards along the vertical direction Z. For an angle of inclination θ less than 0°, the front region 4b of the seat part 4 and/or a front region 3b of the support element 3 is pivoted downwards along the height direction Z.

The at least one first limb 6 is arranged along the longitudinal axis X behind the at least one second limb 7. Furthermore, the at least one first limb 6 and the at least one second limb 7 are connected along the longitudinal axis X by means of a first longitudinal connection 9. The first longitudinal connection 9 is realised by the at least one support element 3 or by the seat part 4. In FIGS. 8 to 15c, the support element 3 comprises a plate-like element 30 on which the seat part 4 can be arranged. The first longitudinal connection 9 is thus provided by the plate-like element 30.

Furthermore, the at least one first limb 6 is connected to the at least one second limb 7 along the longitudinal axis X by means of a second longitudinal connection 10, which is realised by the seat substructure 5.

The at least one first limb 6 and the at least one second limb 7 each have a first portion 6a, 7a and a lever portion 6b, 7b. The first portion 6a, 7a and the lever portion 6b, 7b extend substantially in a straight line, and together form an angle β, as a result of which the at least one first limb 6 and the at least one second limb 7 are designed substantially in the shape of an L. The angle β is accordingly in a range between 20° and 100°, preferably between 45° and 90°, more preferably between 95° and 85°, more preferably 90°. Accordingly, a bend region 6c, 7c is provided between the first portion 6a, 7a and the lever portion 6b, 6b.

The at least one first limb 6 is mounted rotatably about a first axis of rotation 11 relative to the support element 3. The at least one first limb 6 and the support element 3 together form a first angle α. Advantageously, the angle α is formed between a central axis of the first limb 6 and an imaginary reference line of the support element, which is substantially perpendicular to the seat part.

The at least one second limb 7 is mounted rotatably about a second axis of rotation 12 relative to the support element 3. Each of the first portions 6a, 7a of the at least one first limb 6 and of the at least one second limb 7 has an upper end region in which is arranged the axis of rotation 11, 12 with respect to the rotation relative to the support element 3.

The at least one first limb 6 is mounted rotatably about a third axis of rotation 13 relative to the seat substructure 5. The at least one second limb 7 is mounted rotatably about a fourth axis of rotation 14 relative to the seat substructure 5. The third axis of rotation 13 and the fourth axis of rotation 14 are arranged in the respective bend regions 6c, 7c. Accordingly, the first portion 6a of the first limb 6 would extend substantially between the first axis of rotation 11 and the third axis of rotation 13. The first portion 7a of the second limb 7 extends substantially between the second axis of rotation 12 and the fourth axis of rotation 14.

The at least one second limb 7 is indirectly connected to the at least one support element 3. The at least one second limb 7 is connected to the support element 3 via a spacer element or a connecting rod 33. The spacer element and/or connecting rod 33 is rotatable about the second axis of rotation 12 relative to the at least one second limb 7. Furthermore, the spacer element or connecting rod 33 is rotatable about a seventh axis of rotation 34 relative to the support element 3. The spacer element 33 provides additional degrees of freedom by means of which an adjustment of the inclination of the seat part 4 is facilitated.

The connecting element 19 is arranged between the lever portion 6b of the first limb 6 and the lever portion 7b of the second limb 7. The first limb 6 is mounted rotatably about a fifth axis of rotation 15 relative to the connecting element 19. The second limb 7 is mounted rotatably about a sixth axis of rotation 16 relative to the connecting element 19. The fifth axis of rotation 15 and the sixth axis of rotation 16 are each arranged in a lower end region of the lever portions 6b, 7b. Each of the lever portions 6b, 7b thus extends substantially between the third axis of rotation 13 and the fifth axis of rotation 15 and/or between the fourth axis of rotation 14 and the sixth axis of rotation 16, respectively. Accordingly, a third longitudinal connection 23, preferably modifiable in length, can be defined along the longitudinal axis X, which extends between the lever portion 6b of the at least one first limb 6 and the lever portion 7b of the at least one second limb 7 and is realised by the connecting element 19.

The apparatus 2 comprises two first limbs 6 and two second limbs 7. The two first limbs 6 and the two second limbs 7 are each spaced apart from each other along the width axis Y. The two opposite first limbs 7 and the two opposite second limbs 7 are each substantially identical. The further description of the limbs 6, 7 in the form of at least one limb 6, 7 is accordingly to be applied to the pair of limbs in each case. The two first limbs 6 and the two second limbs 7 can still be rotated about the same axes of rotation 11, 12, 13, 14, 15, 16. Furthermore, the limbs 6, 7 lying opposite each other along the width axis Y are connected by means of at least one transverse connection 24. Such a transverse connection 24 is realised by the support element 3, which is designed as a plate-like element 30. Further struts, plates, etc. can also be present, likewise forming the transverse connection 24.

The angle α can be adjusted by means of an angle adjustment device 8. A change in the angle α causes a displacement of the at least one support element 3 along a height axis Z and along a longitudinal axis X. A change in the angle α, which causes a displacement of the at least one support element 3 downwards along the height axis Z also causes a displacement of the at least one support element 3 forward along the longitudinal axis X and optionally (if the lever portion 7b has a greater length than the lever portion 6b) a change in the angle of inclination θ in the negative direction. A change in the angle α which causes the at least one support element 3 to be displaced upwards along the height axis Z simultaneously causes the at least one support element 3 to be displaced rearwards along the longitudinal axis X and optionally (if the lever portion 7b has a greater length than the lever portion 6b) a change in the angle of inclination θ in the positive direction.

In the embodiment according to FIGS. 5a to 5c, the lever portion 7b of the at least one second limb 7 has a greater length than the lever portion 6b of the at least one first limb 6. When the angle α is changed by an angle adjustment device 8, the at least one first limb 6 rotates about the third axis of rotation 13; the mechanical coupling by means of the connecting element 19 causes the at least one second limb 7 to rotate about the fourth axis of rotation 14. The corresponding angle of rotation about this fourth axis of rotation 14 is determined by the length of the lever portion and/or the distance between the sixth axis of rotation 16 and the fourth axis of rotation 14. Due to the greater length of the lever portion of the second limb 7, the at least one second limb 7 is rotated about the fourth axis of rotation by a greater angle of rotation than the at least one first limb 6 about the third axis of rotation 13. The rotation of the at least second limb 7 about the fourth axis of rotation 14 causes the spacer element 33 to rotate about the second axis of rotation 12 and the seventh axis of rotation 34. This in turn causes a change in the angle of inclination θ. Furthermore, the support element 3 is displaced along the height direction Z and along the longitudinal direction X.

When the length of the connecting element 19 is modified, the distance between the fifth axis of rotation 15 and the sixth axis of rotation 16 and/or between the two lever portions 6b, 7b of the limbs 6, 7 is reduced or increased.

The modification of the length of the connecting element 19 causes the at least one second limb 7 to rotate about at least the sixth axis of rotation 16 and about the fourth axis of rotation 14. Furthermore, the modification of the length of the connecting element 19 can also cause the at least one second limb 7 to rotate about the second axis of rotation 12. The angle α can, but does not have to, be fixed during the modification.

Figure 4D:
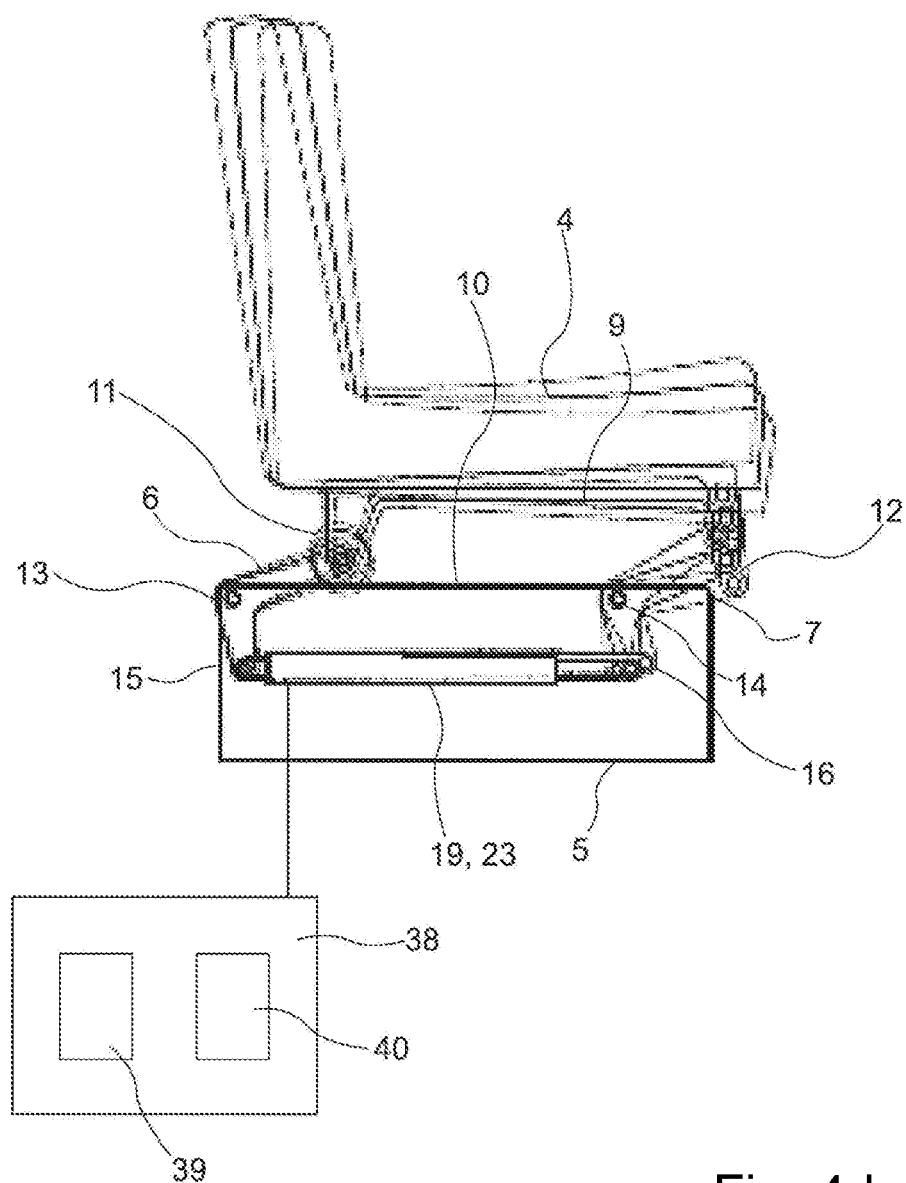
Figure 15A:
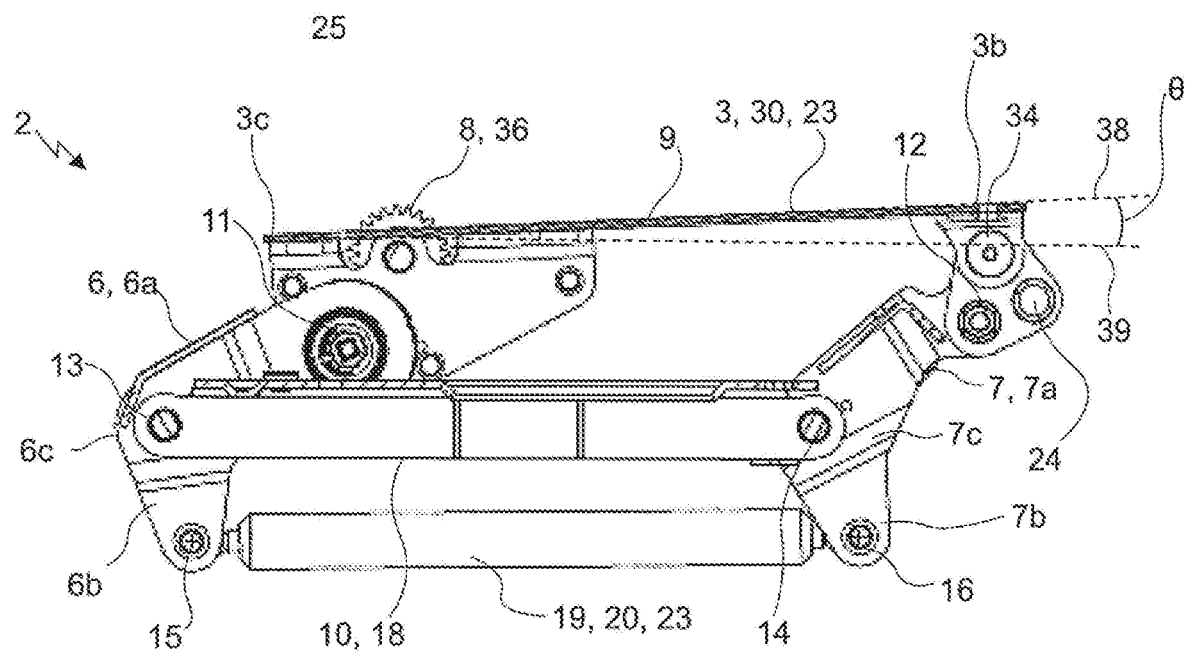
FIGS. 15a to 15c is a side view of the apparatus for adjusting a seat position in different inclined positions.
Figure 15B:
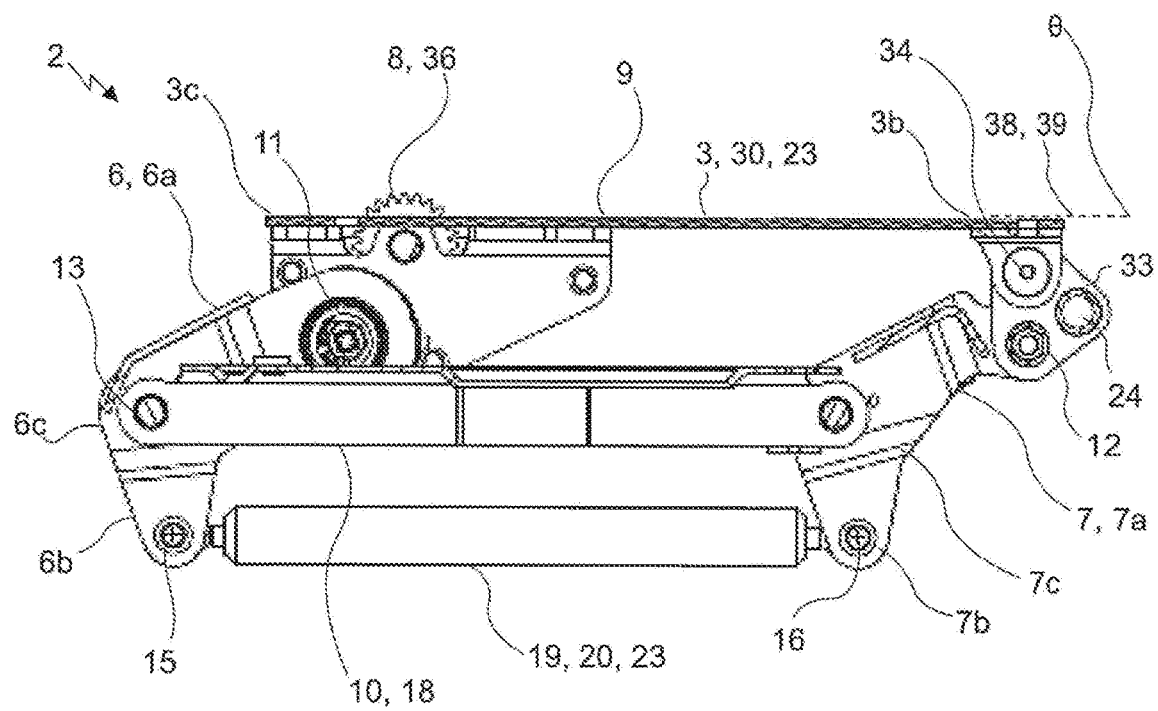
Figure 15C:
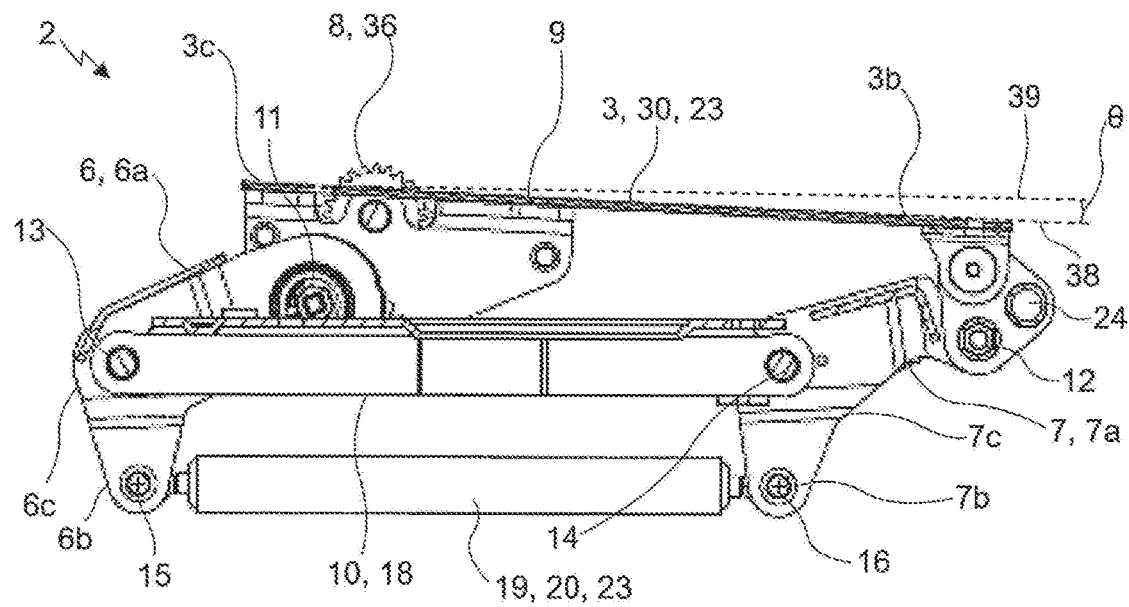

The angle of inclination θ extends between a central axis 38 of the at least one support element 3 and a reference axis 39, which is substantially parallel to the longitudinal axis X of the apparatus 2. The change in the angle of inclination θ is proportional to the change in the length of the connecting element 19. FIGS. 4a and 15a illustrate an inclination of the support element 3 and/or the seat part 4 rearwards. The second axis of rotation 12, the seventh axis of rotation 34 and thus a front region of the support element 3 and/or of the seat part 4 are displaced and/or pivoted upwards along the height axis Z. The length of the connecting element 19 has been increased and the sixth axis of rotation 16 has been shifted forwards substantially along the longitudinal axis X. The angle of inclination θ accordingly has positive values. In FIGS. 4b and 15b, the support element 3 and/or the seat part is oriented substantially horizontally. The angle of inclination θ between a central axis 38 and the reference axis 39 is thus substantially 0°. FIGS. 4c and 15c illustrate an inclination of the support element 3 and/or the seat part 4 forwards. The second axis of rotation 12, the seventh axis of rotation 34 and thus a front edge region of the support element 3 or of the seat part 4 is displaced and/or pivoted downward along the height axis Z. The length of the connecting element 19 has been reduced and the sixth axis of rotation 16 displaced rearwards substantially along the longitudinal axis X. The angle of inclination θ in this case has negative values. The vehicle seat 1 is shown in FIG. 4d, with various inclination settings of the vehicle seat 1 being indicated.

The spacer element or the connecting rod 33, respectively, rotates during the inclination changes in a manner corresponding to FIGS. 4a to 4c and 15a to 15c. With the substantially horizontal orientation of the seat part 4 in FIGS. 4b and 15b, the spacer element and/or the connecting rod 33 is aligned in such a manner that the second axis of rotation 12 and the seventh axis of rotation 34 are arranged one above the other substantially along the height axis Z. In the inclination arrangement of the seat part 4 according to FIGS. 4a and 15a, the spacer element and/or the connecting rod 33 is oriented in such a manner that the seventh axis of rotation 34 is displaced forward relative to the second axis of rotation 12 along the longitudinal direction X. In the inclination arrangement of the seat part 4 according to FIGS. 4c and 15c, the spacer element and/or the connecting rod 33 is oriented in such a manner that the seventh axis of rotation 34 is displaced rearwards relative to the second axis of rotation 12 along the longitudinal direction X.

The length of the connecting element 19 is continuously adjustable. In addition, the connecting element 19 is suitable and provided for maintaining its modifiable length, preferably until a new modification is carried out. Consequently, corresponding and undesired force inputs into the apparatus 2 and/or the connecting element 19 do not cause any undesired change in the length of the connecting element 19. The connecting element 19 can be a lockable gas spring or an actuating element. However, other similar elements by means of which the length can be modified and held can also be contemplated. An actuating element comprises, for example, a lifting spindle which is driven by a drive, for example an electric motor. The rotating movement of the drive is converted into a linear movement by the lifting spindle. In the rest position, the lifting spindle blocks any further linear movement. Lockable gas springs can be locked steplessly in the pulling or pushing direction. As a rule, lockable gas springs comprise a piston/valve system which separates the two pressure spaces in the spring from one another. This enables the stepless locking without any exertion of force. If the valve spindle is released from the outside and the exchange between the two pressure chambers is interrupted, the gas spring locks.

The connecting element can be operated manually by means of an operating element, for example a lever. Alternatively or additionally, an operating and control device 38 by means of which the connecting element 19 can be actuated can be provided. The one operating and control device 38 can include an operating element 40, which can be a lever, a button, a joystick or the like. The operating and control device 38 can furthermore comprise a storage device 39 by means of which certain length values of the connecting element 19 can be stored. This is shown, for example, in FIG. 4d. The user can therefore directly control certain preferred inclination settings.

The first portion 6a of the at least one first limb 6 and the first portion 7a of the at least one second limb 7 have the same length. The first axis of rotation 11 and the second axis of rotation 12 lie on a first imaginary or real connecting line 17. Likewise, the third axis of rotation 13 and the fourth axis of rotation 14 lie on a second imaginary or real connecting line 18. The first connecting line 17, the second connecting line 18 and the first portions 6a, 7a of the at least one first limb 6 and the at least one second limb 7 thus form a first trapezoid 21. This can be seen clearly in FIG. 2c. Since the two connecting lines 17 and 18 have the same length, the trapezoid 21 is a parallelogram.

Figure 9:
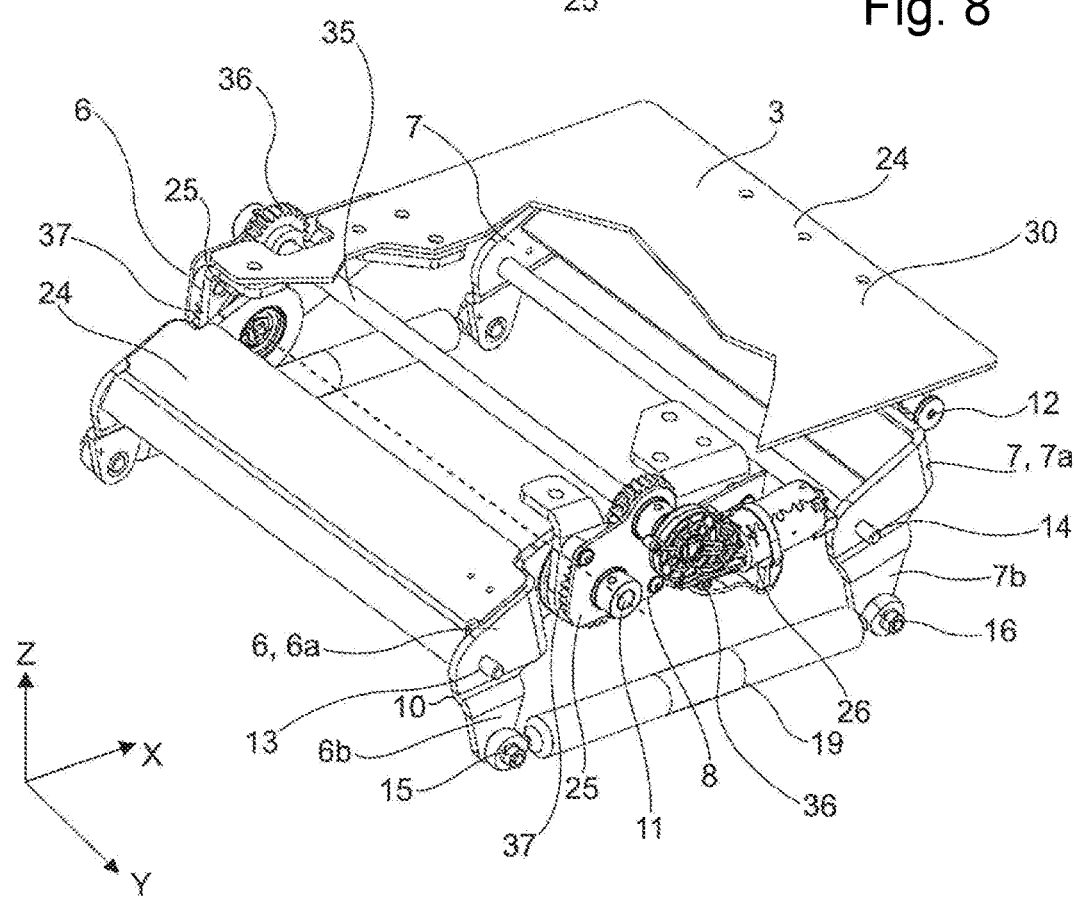
FIG. 9 is an isometric view of the apparatus for adjusting a seat position.

From FIG. 9 it can be seen that a pivot joint or a rotary mount is arranged in the end regions of the two first limbs 6, in the end regions of the two second limbs 7, and in the bend regions 6c, 7c. Each of the axes of rotation 11, 12, 13, 14, 15, 16 is therefore imaginary. Of course, a continuous real axis of rotation 11, 12, 13, 14 could also be provided in each case.

The fifth axis of rotation 15 and the sixth axis of rotation 16 lie on a third imaginary or real connecting line 20.

In the embodiments according to FIGS. 2a to 2c and 4a to 4d, the lever portion 6b of the at least one first limb 6 and the lever portion 7b of the at least one second limb 7 have the same length. Accordingly, the second connecting line 18, the third connecting line 20 and the lever portions 6b, 7b form a second trapezoid 22.

In the embodiments according to FIGS. 3a to 3c and 5a to 5c, the lever portion 7b of the at least one second limb 7 has a greater length than the lever portion 6b of the at least one first limb 6. The second connecting line 18, the third connecting line 20, and the lever portions 6b, 7b accordingly form an irregular rectangle 31. As a result, when the angle α changes, in addition to a change in the seat position along the height axis Z and the change in the seat position along the longitudinal axis X, a change in the inclination of the seat part 4 and/or the support element 3 can also be caused. With a corresponding adjustment of the length of the connecting element 19, the inclination of the seat part 4 can be adjusted in such a way that the seat part 4 is oriented horizontally.

The first connecting line 18 can accordingly correspond to the first longitudinal connection 9. In FIGS. 1 to 14, however, it is shown that the first longitudinal connection 9 and the first imaginary connection line 18 are spaced apart from each other along the height axis Z. The second connecting line 18 corresponds to the second longitudinal connection 10, although the invention is not restricted to this. The third connection line 20 can, but does not have to, correspond to the third longitudinal connection 23 and/or the connecting element 19. The mechanical coupling preferably comprises the first longitudinal connection 9, the second longitudinal connection 10, the third longitudinal connection 23. Furthermore, in the embodiment in which the first limbs 6 and second limbs 7 are designed as pairs of limbs, the transverse connection 24 can be considered to belong to the mechanical coupling.

The at least one first limb 6 or the corresponding pair of limbs, respectively, is arranged directly on the support element 3 via a rotary mount and/or is rotatably mounted. The first axis of rotation 11 accordingly runs centrally through this rotary mount. The at least one second limb 7 and/or the corresponding pair of limbs is arranged and/or mounted on the support element 3 indirectly via the spacer element 33 and a corresponding rotary mount. Furthermore, the spacer element 33 is arranged on the support element 3 by means of a further rotary mount. The second axis of rotation 12 accordingly runs centrally through this rotary mount. The at least one second limb 7 or the corresponding pair of limbs can also be arranged and/or mounted directly on the support element 3 via a rotary mount.

Figure 2B:
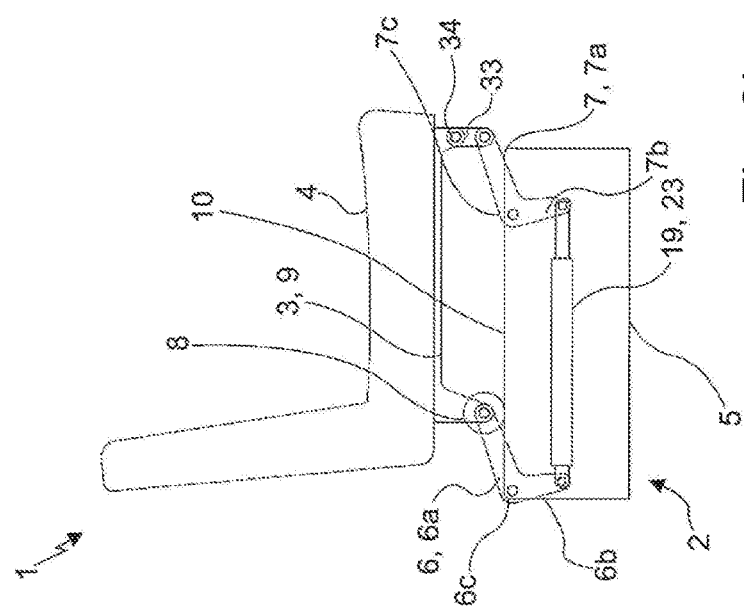
Figure 2A:
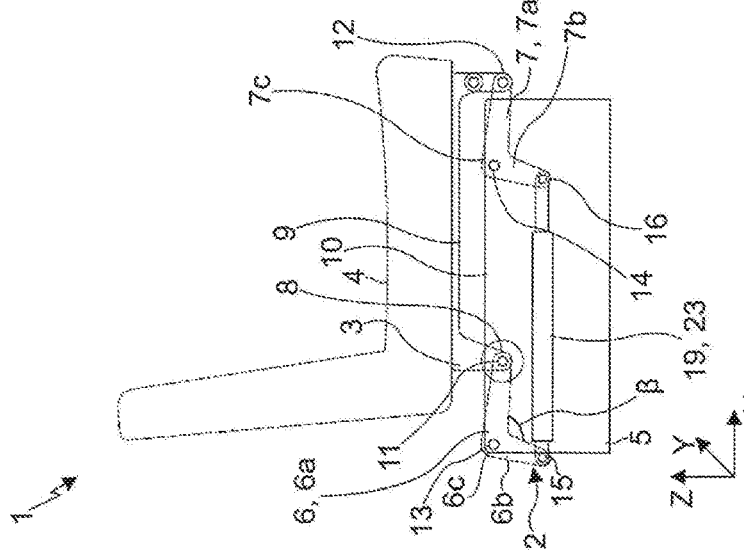

In the embodiment based on FIGS. 2a to 2c, the kinematics of the height adjustment is implemented in the form of a second trapezoid 22. This trapezoid 22 can be changed in order to enable an additional inclination adjustment via the degree of freedom of the movable connecting rod 33. In the event of a change in height, the seat part 4 moves upwards (downwards) parallel to the starting position—that is to say, no angle change is made in the XY plane with respect to the seat part 4. An angle change in this case can only take place by changing the length of the connecting element 19. At the same time, the seat part 4 moves rearwards (forwards) in the longitudinal direction X due to the pivoting movement of the limbs 6, 6. If no inclination adjustment is required in this embodiment, the kinematics can also be designed as a simple parallelogram. In this case, the connecting rod 33 can also be omitted and is then connected directly to the support element 3 adapted for this purpose via the second axis of rotation 12. In FIG. 2a, a lowermost position is shown in which the lowest seat height is assumed. Furthermore, the seat position in the longitudinal direction X is maximally towards the front. In FIG. 2c, a top position is shown in which the maximum seat height and the maximum seat position rearwards in the longitudinal direction X is assumed. In FIG. 2b, a corresponding middle seat position is shown. The seat position in the longitudinal direction can, however, optionally be modified further by an additional adjustment device.

In the embodiment based on FIGS. 3a to 3c, the kinematics of the height adjustment is implemented in the form of an irregular rectangle. This enables a further change in the inclination of the upper part of the seat in the XY plane. In the event of a change in height, the seat part 4 does not move upwards (downwards) parallel to the starting position—that is, an angle change is made in the XY plane with respect to the seat part 4. This kinematic sequence is achieved through different geometries of the two limbs 6, 7. In the figures shown, the seat surface inclines forwards or rearwards when the height changes. An additional inclination adjustment is possible by means of the connecting element 19 which can be modified in length. The connecting element 19 can, however, also be provided as a rigid element. However, in this case it is necessary that a spacer element 33 or connecting rod is provided. A pivoting of the spacer element 33 about the second axis of rotation 12 and the seventh axis of rotation 34 enables a corresponding compensation along the longitudinal axis X, thereby preventing an inclination of the seat part 4. Accordingly, the height of the seat part 4 can be changed upwards (downwards) parallel to the starting position—that is, no change is made in the angle in the XY plane with respect to the seat part 4. In FIG. 3a, a lowest position is shown in which the lowest seat height is assumed. Furthermore, the seat position in the longitudinal direction X is maximally towards the front. In FIG. 3c, an uppermost position is shown in which the maximum seat height and the maximum seat position rearwards in the longitudinal direction X is assumed. In this case, the seat part is substantially horizontal due to a corresponding rotation of the connecting rod 33. In FIG. 3b, a corresponding middle seat position is shown. The seat position in the longitudinal direction can, however, optionally be modified further by an additional adjustment device.

In the embodiment based on FIGS. 4a to 4c, kinematics are shown by means of a second trapezoid 22. In this kinematic system, the inclination is adjusted by changing the length of the connecting element 19. In the case shown, there is an angle change of the XY plane of approx. +/−3° from the central position, starting around the Y axis. In the version described, the connecting element 19 is designed as a lockable gas spring. This includes a defined extension force and also defined terminal positions (in-length/out-length). Other designs are also envisaged for this connecting element 19, such as an electrical variant in the form of a lifting spindle with the possibility of memorisation. FIG. 4b shows a seat position in which the seat part is oriented substantially horizontally and/or parallel to an XY plane which spans the longitudinal axis X and the width axis Y. In FIG. 4a, a seat position is shown in which the seat part 4 is inclined rearwards. In comparison to the seat position in FIG. 4b, the connecting element 19 has a greater length in this case. In FIG. 4c, a seat position is shown in which the seat part 4 is inclined forward. In comparison to the seat position in FIG. 4b, the connecting element 19 has a shorter length in this case. Here, too, a corresponding compensation of the deflection along the longitudinal axis is made possible by a rotation of the connecting rod 33.

In the embodiment shown in FIGS. 5a to 5c, a kinematics of the height adjustment is implemented in the shape of an irregular rectangle, which enables additional inclination adjustment by means of a length-modifiable connecting element 19, similar to the embodiment according to FIGS. 4a to 4c. In contrast to that embodiment, the change in inclination in the lift-up region can mainly be used to enable a horizontal for the XY plane. In the lower to middle positions, the system behaves similarly to the embodiment based on FIGS. 5a to 5c. FIG. 4b shows a seat position in which the seat part is oriented substantially horizontal and/or parallel to an XY plane which spans the longitudinal axis X and the width axis Y. FIG. 5b shows a seat position in which the seat part is oriented substantially horizontal or parallel to the XY plane. In FIG. 5a, a seat position is shown in which the seat part 4 inclines rearwards. In FIG. 5c, a seat position is shown in which the seat part 4 inclines forwards. Here, too, a corresponding compensation of the deflection along the longitudinal axis is made possible by a rotation of the connecting rod 33.

Figure 6:
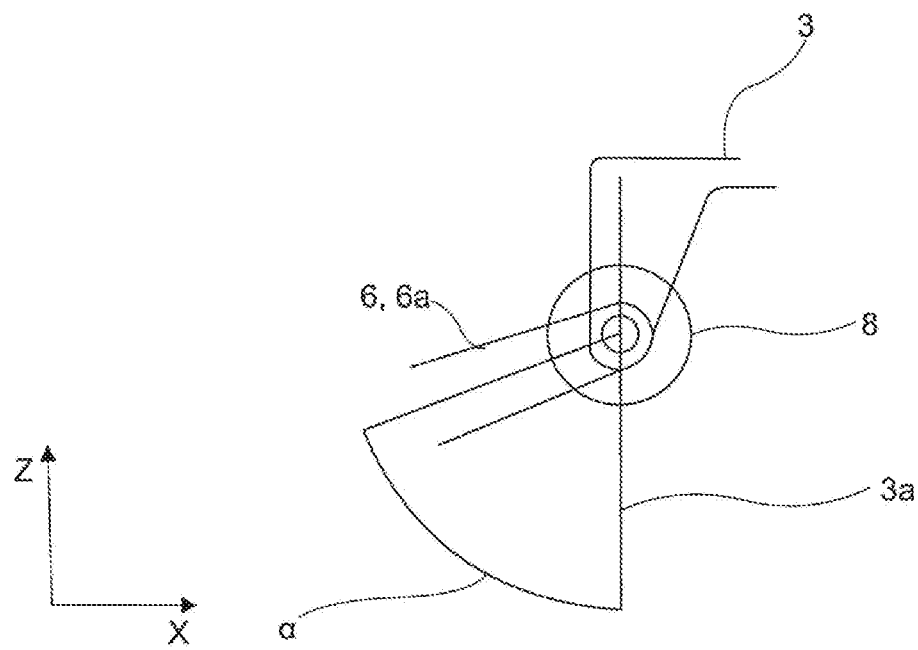
FIG. 6 is a detailed view comprising the first axis of rotation.

In FIG. 6, the detail around the first axis of rotation 11 is shown enlarged. In particular, the angle α is clearly visible here. The angle α extends between a central axis 6d of the first limb 6 and an imaginary reference line of the support element 3a. This reference line is substantially perpendicular to the plate-like element 30. For an uninclined orientation of the support element 3 and/or the seat part 4, in which the seat part 4 runs substantially parallel to XY plane, the reference line of the support element 3a is substantially parallel to the height axis Z. The angle α is in a range between 0° and 140°. The angle α is preferably in a range between 0° and 120°. The angle α is more preferably in a range between 0° and 90°.

Figure 7:
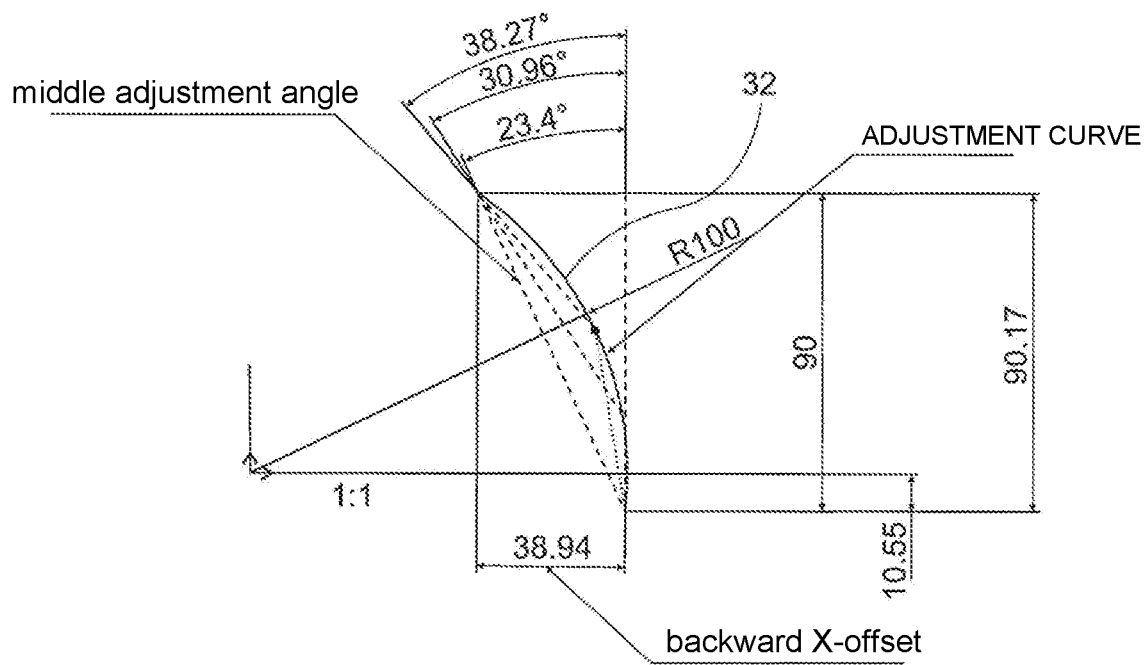
FIG. 7 shows an adjustment curve of the vehicle seat.
Figure 8:
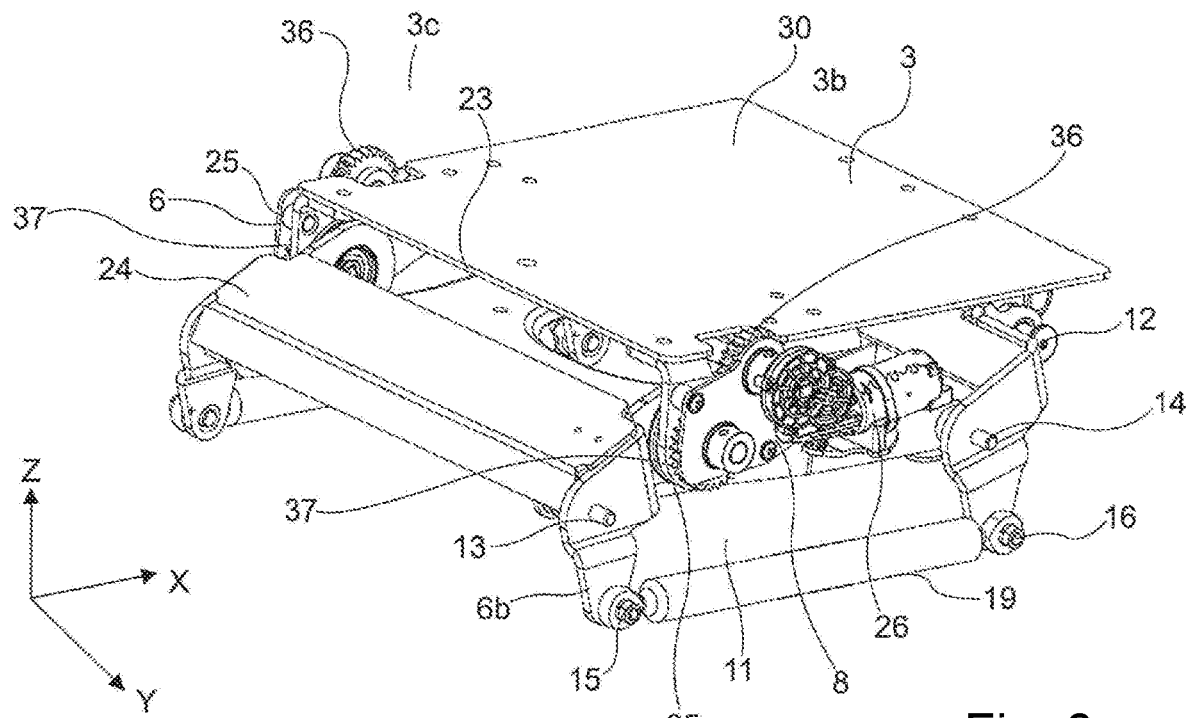
FIG. 8 is an isometric view of the apparatus for adjusting a seat position.

An adjustment curve 32 of the vehicle seat 1 can be seen in FIGS. 1a, 1b and 7. A change in the angle α which causes the at least one support element 3 and/or the seat part 4 to be displaced downward along the height axis Z simultaneously causes the at least one support element 3 and/or the seat part 4 to be displaced forwards along the longitudinal axis X. A change in the angle α which causes the at least one support element 3 and/or the seat part 4 to be displaced upwards along the height axis Z simultaneously causes the at least one support element 3 and/or the seat part to be displaced rearwards along the longitudinal axis X. FIG. 7 shows exemplary values for the adjustment angle, the rearwards offset, and the offset to the top. The invention is of course not limited to these values.

The angle adjustment device 8 can be clearly seen in FIGS. 8 to 14. The angle adjustment device 8 comprises a locking device 25, which can also be referred to as a recliner and which sets an adjusted angle α. Furthermore, the angle adjustment device 8 comprises a drive 26 by means of which the locking device 25 is driven in order to change the angle α. The angle adjustment device 8 preferably comprises a control unit which controls the drive 26. It is advantageous that certain seat positions can be stored in the control unit. The user can then switch between the saved positions. An operating device by means of which the user can make appropriate inputs is preferably provided. The drive 26 is connected with a form fit to a primary shaft 35. The primary shaft 35, which is provided for reasons of installation space, extends from the right to the left side and contains at both ends a spur gear 36 that is likewise connected in a form-fitting manner. The spur gears 36 of the primary shaft 35 each transmit the force to a further spur gear 37; these are also connected by a form fit by means of short secondary axles to respective locking devices 25 and/or recliners. The two locking devices 25 connect the first limbs 6 on the left and right, respectively, to the support element 3 with a friction fit. When the height adjustment is actuated, a torque is accordingly generated by the drive 26. The torque and the rotation are transmitted from the primary shaft 35 to the secondary shafts, which are connected to the locking device 25, by means of the spur gears 36, 37. The torque is accordingly transmitted synchronously left and right. This causes the first limbs to pivot relative to the support element 3.

Figure 10:
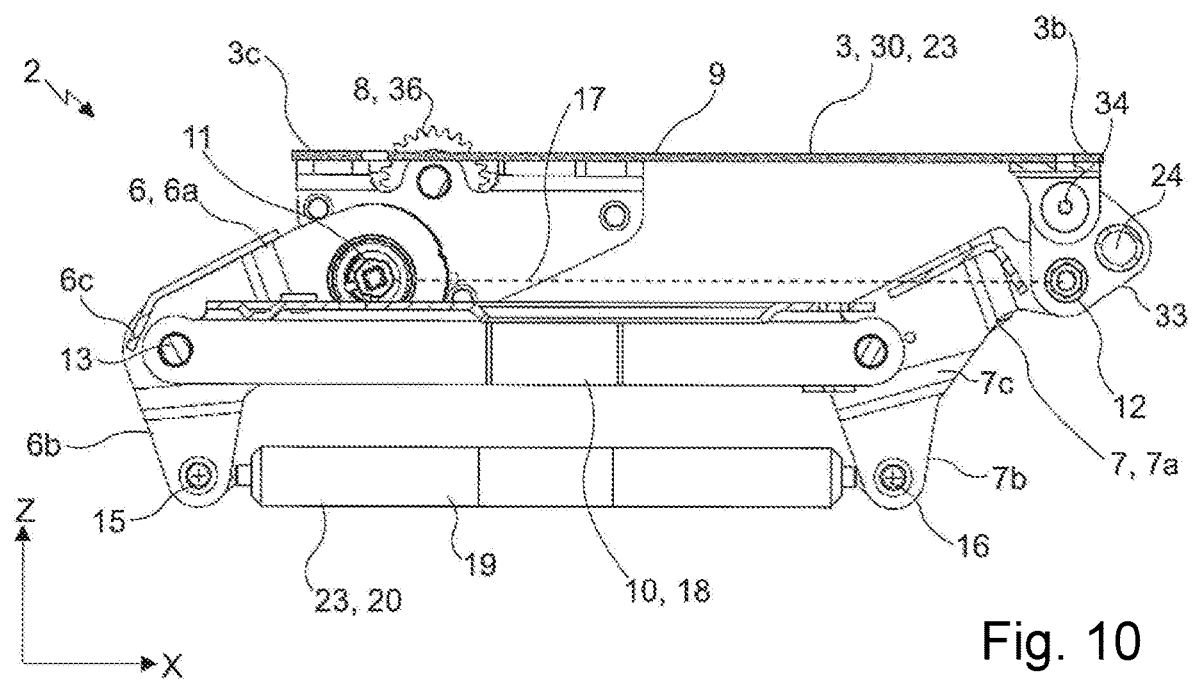
FIG. 10 is a side view of the apparatus for adjusting a seat position.
Figure 11:
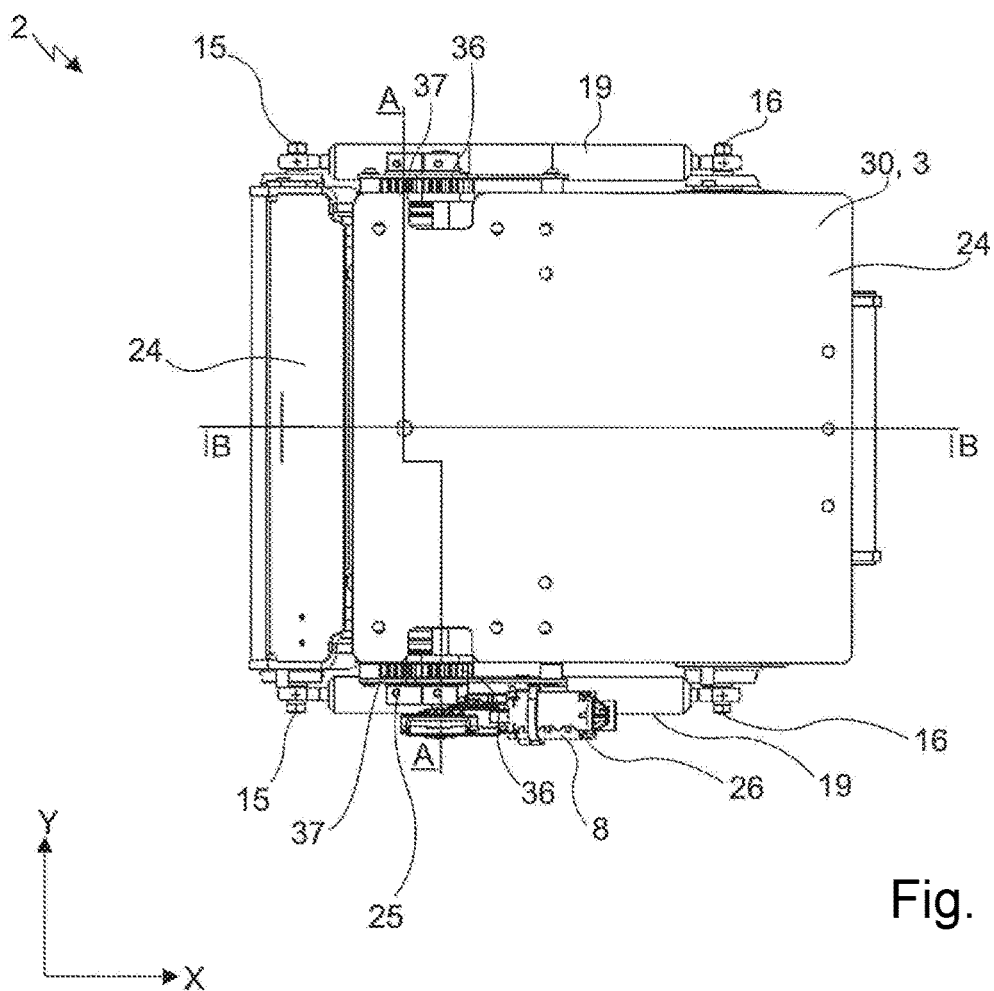
FIG. 11 is a plan view of the apparatus for adjusting a seat position.
Figure 12:
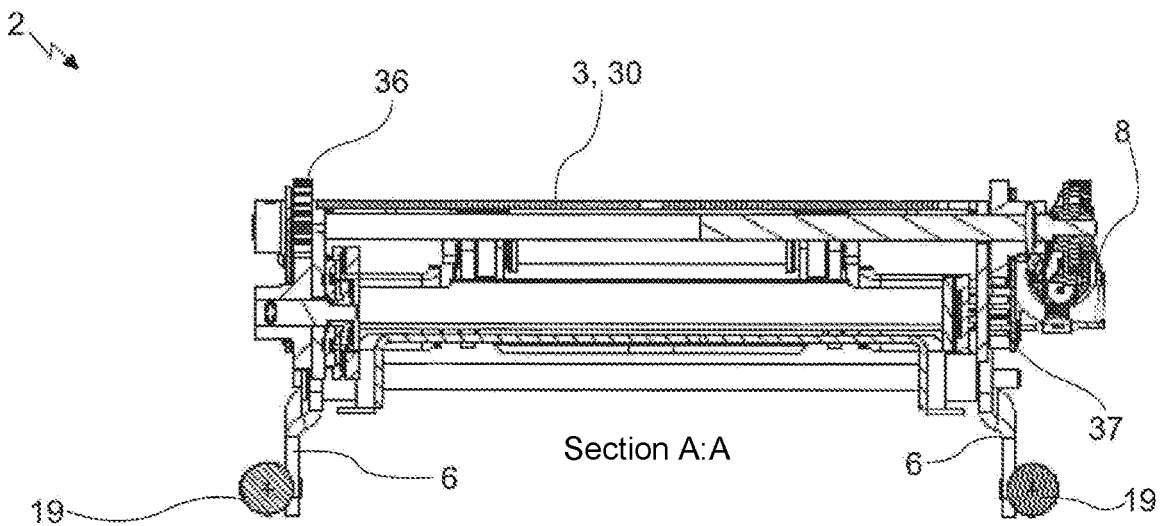
FIG. 12 is a side view of the apparatus for adjusting a seat position.
Figure 13:
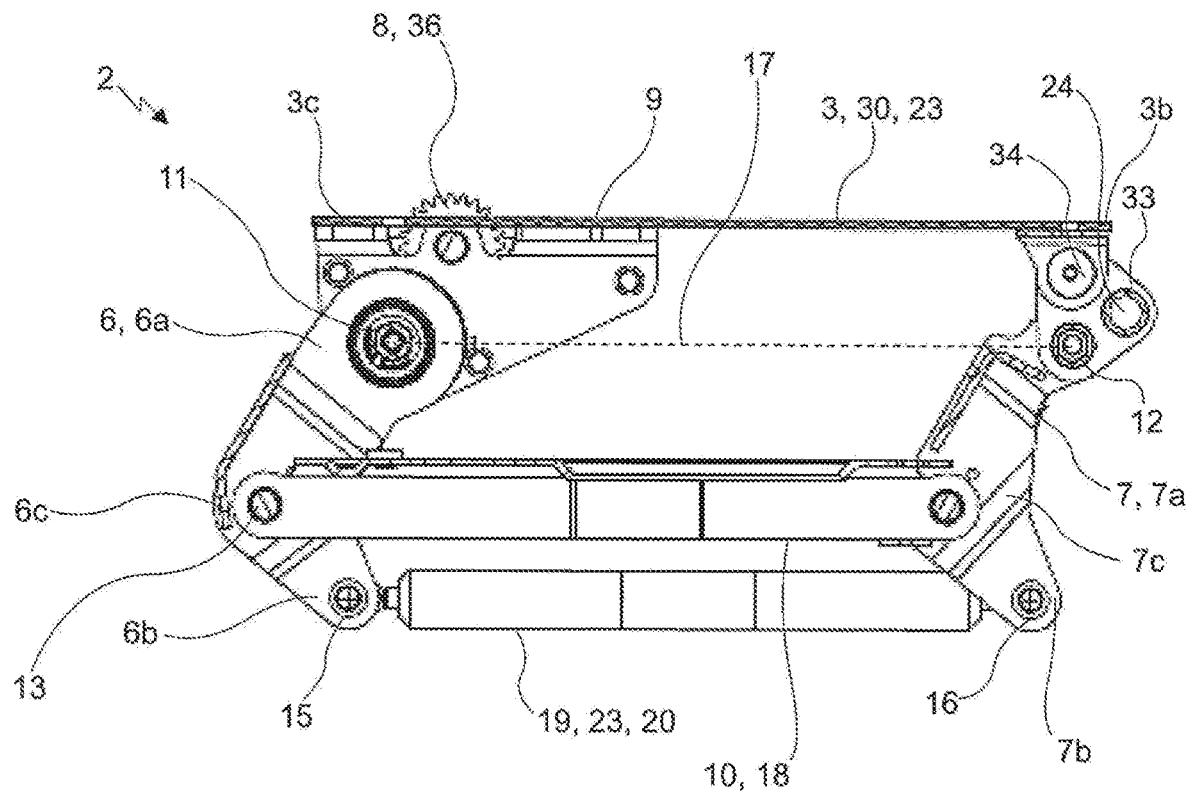
FIG. 13 is a side view of the apparatus for adjusting a seat position.
Figure 14:
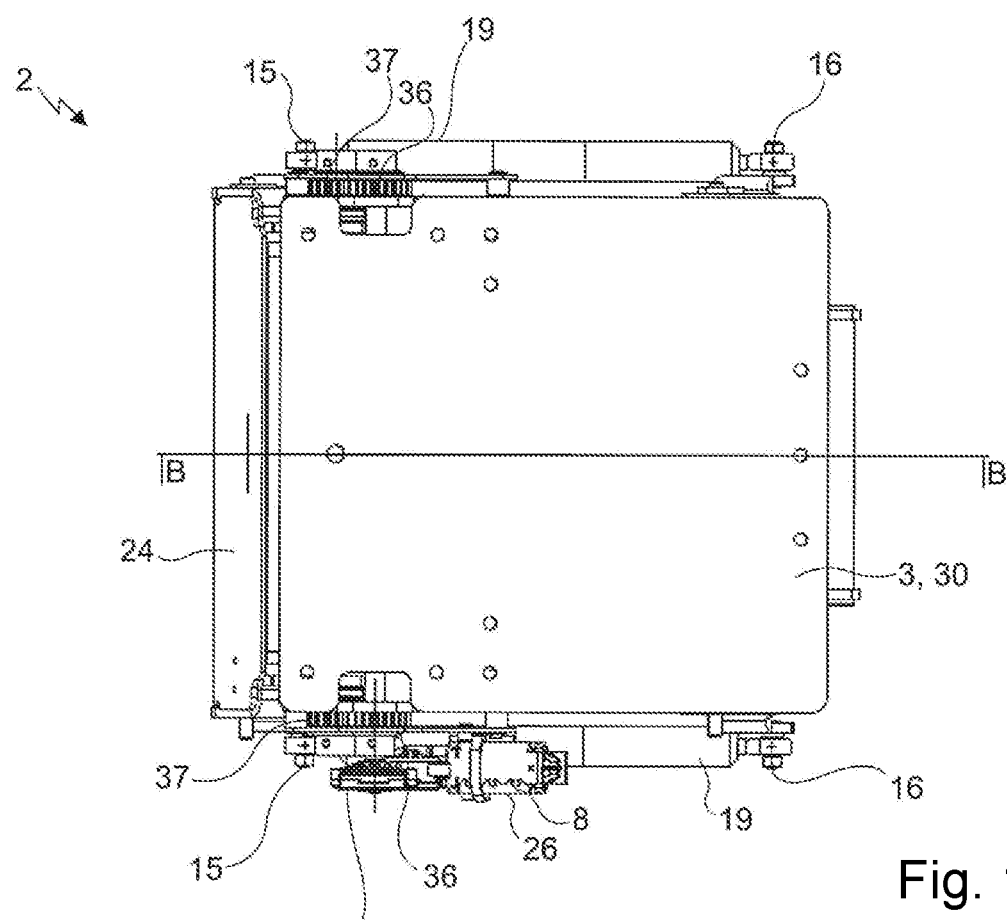
FIG. 14 is a plan view of the apparatus for adjusting a seat position.

FIGS. 11 and 14 each illustrate a top view of the apparatus 2, wherein a section of the apparatus 2 is shown in FIG. 12. FIGS. 10 and 13 show a side view in which the pivoting of the limbs 6, 7 relative to the support element 3 can be seen. The locking and/or positive control of the first limb 6 is performed in this case by the connecting element 19, which can be designed as a rigid element or an element with a variable length.

Such an apparatus 2 can be configured separately from the vertical suspension. Influencing the height adjustment and spring travel is therefore excluded. The apparatus offers an ergonomic adjustment of the seat and creates a height-dependent distance to the steering wheel and pedals.

All features disclosed in the application documents are claimed as being essential to the invention, provided that they are, individually or in combination, novel over the prior art.

LIST OF REFERENCE SIGNS

1 Vehicle seat
2 Apparatus for adjusting a seat position
3 Support element
3a Reference line of the support element
3b Front region of the support element
3c Rear region of the support element
4 Seat part
4a Front region of the seat part
4b Rear region of the seat part
5 Seat substructure
6 First limb
6a First portion of the first limb
6b Lever portion of the first limb
6c Bend region of the first limb
6d Central axis of the first limb
7 Second limb
7a First portion of the second limb
7b Lever portion of the second limb
7c Bend region of the second limb
8 Angle adjustment device
9 First longitudinal connection
10 Second longitudinal connection
11 First axis of rotation
12 Second axis of rotation
13 Third axis of rotation
14 Fourth axis of rotation
15 Fifth axis of rotation
16 Sixth axis of rotation
17 First connecting line
18 Second connecting line
19 Connecting element
20 Third connecting line
21 First trapezoid
22 Second trapezoid
22a Rectangle
23 Third longitudinal connection
24 Transverse connection
25 Locking device
26 Drive
27 Scissor frame
28 Suspension and/or damping device
29 vehicle body floor
30 Plate-like element
31 Rectangle
32 Adjustment curve
33 Spacer element/connecting rod
34 Seventh axis of rotation
35 Primary shaft
36 Spur gear
37 Spur gear
38 Operating and control device
39 Storage device
40 Operating element
Z Height axis
X Longitudinal axis
Y width axis
α Angle
β Angle
θ Angle of inclination

What is claimed is:

1. An apparatus for adjusting a seat position for a vehicle seat, the apparatus comprising:
at least one support element for a seat part that can be connected to a seat substructure; and
at least one first limb and at least one second limb,
wherein the at least one first limb and the at least one second limb can be rotatably arranged on the seat substructure and the at least one support element,
wherein a first angle between the first limb and the at least one support element can be adjusted by an angle adjustment device,
wherein the at least one first limb has a first lever portion and the at least one second limb has a second lever portion,
wherein the first lever portion forms a mechanical coupling with the second lever portion,
wherein a change in the first angle causes a displacement of the at least one support element along a height direction,
wherein the change in the first angle causes a change in an angle of inclination of the support element, and
wherein a front portion of the vehicle seat and a rear portion of the vehicle seat both move along the height direction in a first direction when the first angle is changed,
wherein the mechanical coupling comprises:
a connecting element that connects the first lever portion to the second lever portion,
wherein the change in the angle of inclination is caused by at least one of a different length of the lever portions of the at least one first limb and the at least one second limb or by a modification of a length of the connecting element,
wherein the second lever portion has a greater length than the first lever portion,
wherein the change in the first angle causes a displacement of the at least one support element along a longitudinal axis,
wherein, when the change in the first angle causes a displacement of the at least one support element downwards along the height direction, the change in the first angle also, at the same time, causes a displacement of the at least one support element forwards along the longitudinal axis and a change in the angle of inclination in a negative direction, and
wherein, when the change in the first angle causes a displacement of the at least one support element upwards along the height direction, the change in the first angle also, at the same time, causes a displacement of the at least one support element rearwards along the longitudinal axis and a change in the angle of inclination in a positive direction.

2. The apparatus according to claim 1,
wherein the angle of inclination extends between a central axis of the at least one support element and a reference axis which is substantially parallel to a longitudinal axis of the apparatus, wherein, for an angle of inclination greater than 0 degrees, a front region of the support element is pivoted upwards along the height direction, and wherein, for an angle of inclination less than 0 degrees, a front region of the support element is pivoted downwards along the height direction.

3. The apparatus according to claim 1, wherein the at least one first limb is arranged along a longitudinal axis behind the at least one second limb, wherein the at least one first limb along the longitudinal axis is connected to the at least one second limb by a first longitudinal connection that includes the at least one support element or the seat part, wherein the at least one first limb and the at least one second limb each has a first portion respectively connected to the first lever portion and the second lever portion, and wherein the first portion and the first lever portion and the second lever portion each enclose a respective second angle, such that the at least one first limb and the at least one second limb are substantially L-shaped, with a bend region between the first portion and the lever portions for each of the at least one first limb and the at least one second limb.

4. The apparatus according to claim 3, wherein the at least one first limb and the at least one second limb are each rotatably mounted about an axis of rotation relative to the at least one support element and about a further axis of rotation relative to the seat substructure, wherein the axis of rotation with respect to a rotation relative to the support element is arranged in an upper end region of the first portion of the at least one first limb and the at least one second limb, and wherein the axis of rotation with respect to a rotation relative to the seat substructure is arranged in the bend region of the at least one first limb and the at least one second limb.

5. The apparatus according to claim 3, wherein a modification of a length of a connecting element causes a rotation of the at least one second limb about at least an axis of rotation with respect to a rotation relative to the connecting element and about an axis of rotation with respect to a rotation relative to the seat substructure, and wherein the modification of the length of the connecting element does not cause any rotation of the at least one first limb.

6. The apparatus according to claim 5, wherein the first portion of the at least one first limb and the first portion of the at least one second limb have the same length, wherein the axes of rotation with respect to a rotation relative to the support element of the at least one first limb and the at least one second limb lie on a first imaginary or real connecting line, wherein the axes of rotation with respect to a rotation relative to the seat substructure of the at least one first limb and the at least one second limb lie on a second imaginary or real connecting line, wherein the first connecting line, the second connecting line, and the first portions of the at least one first limb and the at least one second limb form a trapezoid.

7. The apparatus according to claim 1, wherein the at least one second limb is indirectly connected to the at least one support element, wherein the at least one second limb is connected to the support element via a spacer element, wherein the spacer element is rotatable about an axis of rotation relative to the at least one second limb, and wherein the spacer element is rotatable about a further axis of rotation relative to the support element.

8. The apparatus according to claim 7, wherein the angle adjustment device comprises a locking device which sets the first angle, wherein the angle adjustment device comprises a drive that drives the locking device in order to change the first angle.

9. The apparatus according to claim 1, wherein the connecting element maintains a modified length, wherein the connecting element is controllable by an operating and control device, wherein the operating and control device has a storage device that can store certain length values of the connecting element, wherein the length of the connecting element is continuously adjustable, and wherein the connecting element is a lockable gas spring or an actuating element, the actuating element comprising a lifting spindle.

10. The apparatus according to claim 1, wherein two first limbs and two second limbs are provided, wherein the two first limbs are spaced apart from each other along a width axis and are rotatable about the same axes of rotation, wherein the two second limbs are spaced apart from each other along the width axis and are rotatable about the same axes of rotation, wherein the two first limbs are connected by a first transverse connection, and wherein the two second limbs are connected by a second transverse connection.

11. The apparatus according to claim 1, wherein the apparatus is a modular component.

12. A vehicle seat having an apparatus according to claim 1.

13. The vehicle seat according to claim 12, wherein the vehicle seat comprises a scissor frame that attaches the vehicle seat to a vehicle body floor, and wherein the vehicle seat comprises at least one of a suspension or a damping device for respective suspension or damping of at least one of vertical vibrations or horizontal vibrations.

14. The apparatus according to claim 1, wherein the first direction is upward along the height direction.

15. The apparatus according to claim 1, wherein a first portion of the at least one first limb and a first portion of the at least one second limb have the same length, and wherein a second portion of the at least one first limb and a second portion of the at least one second limb have a different length.

16. The apparatus according to claim 15, wherein a first portion of the at least one first limb and a first portion of the at least one second limb respectively connect the at least one first limb and the at least one second limb to the at least one support element, wherein the second portion of the at least one first limb connects the at least one first limb to a first end of a connecting element, and wherein the second portion of the at least one second limb connects the at least one second limb to a second end of the connecting element.

17. An apparatus for adjusting a seat position for a vehicle seat, the apparatus comprising:
at least one support element for a seat part that can be connected to a seat substructure; and
at least one first limb and at least one second limb,
wherein the at least one first limb and the at least one second limb can be rotatably arranged on the seat substructure and the at least one support element,
wherein a first angle between the first limb and the at least one support element can be adjusted by an angle adjustment device,
wherein the at least one first limb has a first lever portion and the at least one second limb has a second lever portion,
wherein the first lever portion forms a mechanical coupling with the second lever portion,
wherein a change in the first angle causes a displacement of the at least one support element along a height direction,
wherein the change in the first angle causes a change in an angle of inclination of the support element,
wherein a front portion of the vehicle seat and a rear portion of the vehicle seat both move along the height direction in a first direction when the first angle is changed,
wherein the mechanical coupling comprises:
a connecting element that connects the first lever portion to the second lever portion,
wherein the change in the angle of inclination is caused by at least one of a different length of the lever portions of the at least one first limb and the at least one second limb or by a modification of a length of the connecting element,
wherein the second lever portion has a greater length than the first lever portion,
wherein the at least one first limb is arranged along a longitudinal axis behind the at least one second limb,
wherein the at least one first limb along the longitudinal axis is connected to the at least one second limb by a first longitudinal connection that includes the at least one support element or the seat part,
wherein the at least one first limb and the at least one second limb each has a first portion respectively connected to the first lever portion and the second lever portion,
wherein the first portion and the first lever portion and the second lever portion each enclose a respective second angle, such that the at least one first limb and the at least one second limb are substantially L-shaped, with a bend region between the first portion and the lever portions for each of the at least one first limb and the at least one second limb,
wherein a modification of a length of a connecting element causes a rotation of the at least one second limb about at least an axis of rotation with respect to a rotation relative to the connecting element and about an axis of rotation with respect to a rotation relative to the seat substructure, and
wherein the modification of the length of the connecting element does not cause any rotation of the at least one first limb.

18. An apparatus for adjusting a seat position for a vehicle seat, the apparatus comprising:
at least one support element for a seat part that can be connected to a seat substructure; and
at least one first limb and at least one second limb,
wherein the at least one first limb and the at least one second limb can be rotatably arranged on the seat substructure and the at least one support element,
wherein a first angle between the first limb and the at least one support element can be adjusted by an angle adjustment device,
wherein the at least one first limb has a first lever portion and the at least one second limb has a second lever portion,
wherein the first lever portion forms a mechanical coupling with the second lever portion,
wherein a change in the first angle causes a displacement of the at least one support element along a height direction,
wherein the change in the first angle causes a change in an angle of inclination of the support element,
wherein a front portion of the vehicle seat and a rear portion of the vehicle seat both move along the height direction in a first direction when the first angle is changed,
wherein the mechanical coupling comprises:
a connecting element that connects the first lever portion to the second lever portion,
wherein the change in the angle of inclination is caused by at least one of a different length of the lever portions of the at least one first limb and the at least one second limb or by a modification of a length of the connecting element,
wherein the second lever portion has a greater length than the first lever portion,
wherein the connecting element maintains a modified length,
wherein the connecting element is controllable by an operating and control device,
wherein the operating and control device has a storage device that can store certain length values of the connecting element,
wherein the length of the connecting element is continuously adjustable, and
wherein the connecting element is a lockable gas spring or an actuating element, the actuating element comprising a lifting spindle.

* * * * *